(12) United States Patent
Hwang et al.

(10) Patent No.: US 12,725,521 B2
(45) Date of Patent: Sep. 1, 2026

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Jaeho Hwang, Seoul (KR); Hanbyul Seo, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 78 days.

(21) Appl. No.: 18/272,033

(22) PCT Filed: Jan. 14, 2022

(86) PCT No.: PCT/KR2022/000735
§ 371 (c)(1),
(2) Date: Jul. 12, 2023

(87) PCT Pub. No.: WO2022/154575
PCT Pub. Date: Jul. 21, 2022

(65) Prior Publication Data

US 2023/0410655 A1 Dec. 21, 2023

(30) Foreign Application Priority Data

Jan. 14, 2021 (KR) ........................ 10-2021-0005432

(51) Int. Cl.
*G08G 1/16* (2006.01)
*H04W 4/38* (2018.01)
*H04W 4/40* (2018.01)

(52) U.S. Cl.
CPC .............. *G08G 1/162* (2013.01); *H04W 4/38* (2018.02); *H04W 4/40* (2018.02)

(58) Field of Classification Search
CPC ........... G08G 1/162; H04W 4/38; H04W 4/40
See application file for complete search history.

(56) References Cited

U.S. PATENT DOCUMENTS

2016/0302046 A1 10/2016 Velusamy
2016/0321923 A1 11/2016 Seo
(Continued)

FOREIGN PATENT DOCUMENTS

KR 10-2015-0096897 8/2015

OTHER PUBLICATIONS

European Patent Office Application Serial No. 22739767.6, Search Report dated Nov. 5, 2024, 16 pages.

*Primary Examiner* — Benyam Haile
(74) *Attorney, Agent, or Firm* — LEE, HONG, DEGERMAN, KANG & WAIMEY

(57) ABSTRACT

The present disclosure relates to an apparatus and method for operating in a wireless communication system which supports SoftV2X communication, the method comprising the operations of: receiving status information including sensor values of a second apparatus; and transmitting information about a road hazard situation detected on the basis of the sensor values, wherein the road hazard situation is detected on the basis of 1) change amounts between a first point in time at which change amounts of the sensor values are greater than a threshold and a second point in time at which the change amounts are back to or below the threshold, and 2) the similarity between the sensor values before the first point in time and after the second point in time.

6 Claims, 28 Drawing Sheets

(56) References Cited

U.S. PATENT DOCUMENTS

2020/0101917 A1 4/2020 Kumar et al.
2020/0353915 A1 11/2020 Rohde et al.
2024/0410703 A1* 12/2024 Shields ............ G08G 1/096791

* cited by examiner (a)

Figure 11:
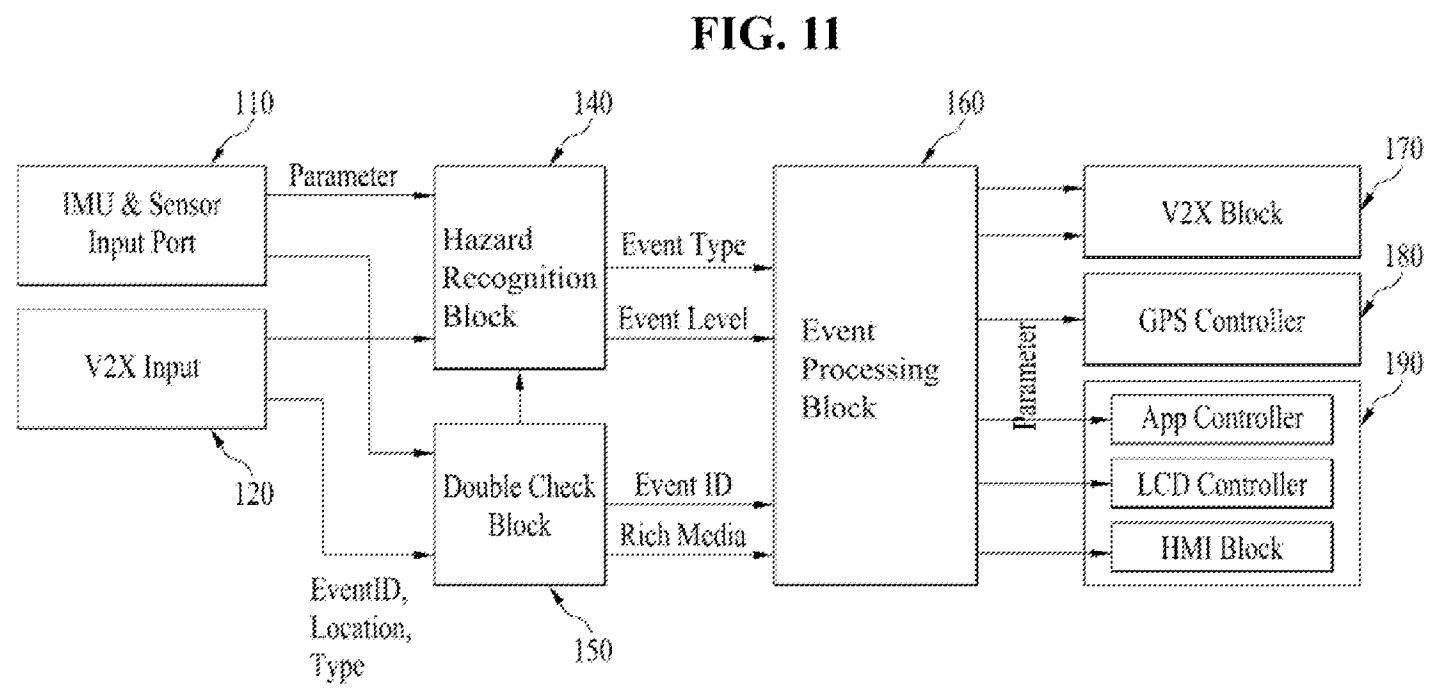

110 IMU & Sensor Input Port
120 V2X Input
140 Hazard Recognition Block
150 Double Check Block
160 Event Processing Block
170 V2X Block
180 GPS Controller
190 App Controller
LCD Controller
HMI Block
Parameter
EventID, Location, Type
Event Type
Event Level
Event ID
Rich Media
Parameter Detection option 3 : Load hazards detection by 3rd party detection

FIG. 17

3rd party server

RSU

SoftV2X Server

SoftV2X UE

Event decection

Msg(Event)

Event announce

SoftV2X msg (Event)

Message type to operation of the SoftV2X system and to connect 3rd part servers

FIG. 27
| Header (VRU) | VRU Payload | | |
|---|---|---|---|
| Header (VRU) | VRU Payload | Hazard Info | Rich data |
|---|---|---|---|
| Header (SoftV2X) | SoftV2X Payload | Hazard Req | Control Req |
|---|---|---|---|
| Header (SoftV2X) | SoftV2X Payload | Hazard Info | Rich data |
|---|---|---|---|
FIG. 28
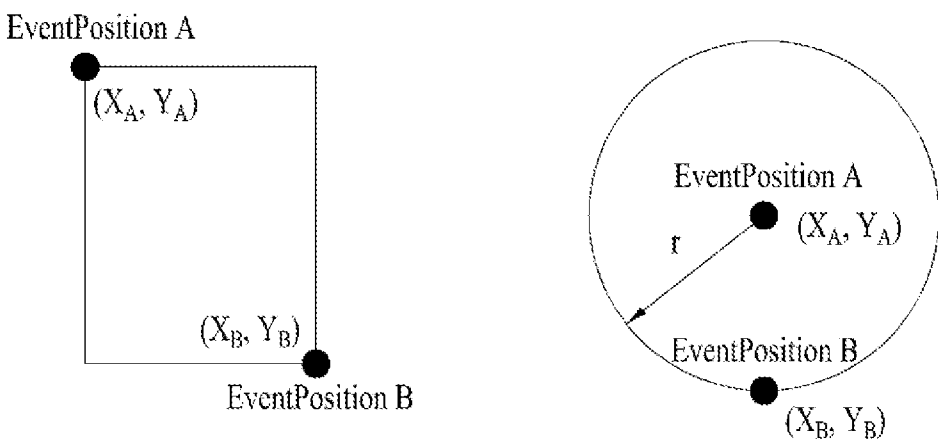
FIG. 29
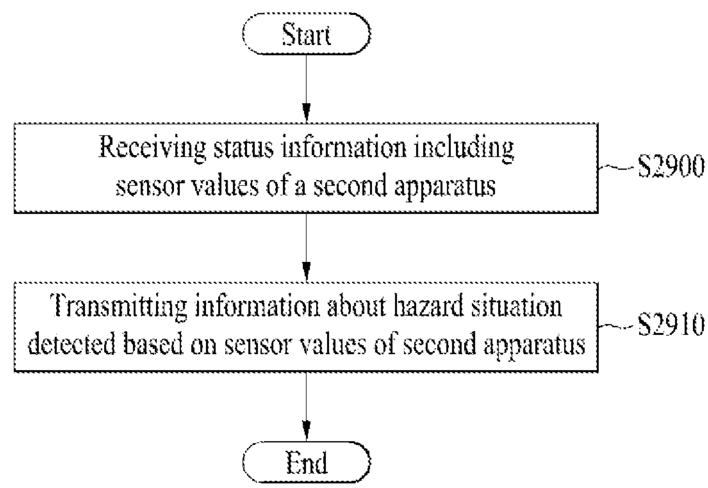

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2022/000735, filed on Jan. 14, 2022, which claims the benefit of earlier filing date and right of priority to Korean Application No. 10-2021-0005432, filed on Jan. 14, 2021, the contents of which are all hereby incorporated by reference herein in their entireties.

TECHNICAL FIELD

The present disclosure relates to a wireless communication system, and more particularly to a method and apparatus for transmitting and receiving a wireless signal.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface (interface between User Equipment and Radio Network System).

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

SUMMARY

The present disclosure provides a method of more efficiently and accurately detecting a hazard situation of a road and an apparatus therefor.

The present disclosure provides a method of efficiently performing a procedure of transmitting and receiving a wireless signal and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to a first aspect of the present disclosure, an operation method of a first apparatus in a wireless communication system supporting soft vehicle to everything (soft V2X) communication includes receiving status information including sensor values of a second apparatus, and transmitting information on a hazard situation of a road detected based on the sensor values, wherein the hazard situation of the road is detected based on 1) change amounts between a first time point at which a change amount of the sensor values becomes larger than a threshold value and a second time point at which the change amount again becomes less than the threshold value, and 2) similarity between the sensor values before the first time point and after the second time point.

According to a second aspect of the present disclosure, a first apparatus operating in a wireless communication system supporting soft vehicle to everything (soft V2X) communication includes at least one radio frequency (RF) unit, at least one processor, and at least one computer memory operably connected to the at least one processor and configured to, when executed, cause the at least one processor to perform an operation, wherein the operation includes receiving status information including sensor values of a second apparatus, and transmitting information on a hazard situation of a road detected based on the sensor values, and wherein the hazard situation of the road is detected based on 1) change amounts between a first time point at which a change amount of the sensor values becomes larger than a threshold value and a second time point at which the change amount again becomes less than the threshold value, and 2) similarity between the sensor values before the first time point and after the second time point.

According to a third aspect of the present disclosure, an operation method of a second apparatus in a wireless communication system supporting soft vehicle to everything (soft V2X) communication includes transmitting status information including sensor values of the second apparatus to a first apparatus, and receiving information on a hazard situation of a road detected based on the sensor values from the first apparatus, wherein the hazard situation of the road is detected based on 1) change amounts between a first time point at which a change amount of the sensor values becomes larger than a threshold value and a second time point at which the change amount again becomes less than the threshold value, and 2) similarity between the sensor values before the first time point and after the second time point.

According to a fourth aspect of the present disclosure, a second apparatus operating in a wireless communication system supporting soft vehicle to everything (soft V2X) communication includes at least one radio frequency (RF) unit, at least one processor, and at least one computer memory operably connected to the at least one processor and configured to, when executed, cause the at least one processor to perform an operation, wherein the operation includes transmitting status information including sensor values of the second apparatus to a first apparatus, and receiving information on a hazard situation of a road detected based on the sensor values from the first apparatus, and the hazard situation of the road is detected based on 1) change amounts between a first time point at which a change amount of the sensor values becomes larger than a threshold value and a second time point at which the change amount again becomes less than the threshold value, and 2) similarity between the sensor values before the first time point and after the second time point.

According to a fifth aspect of the present disclosure, an apparatus operating in a wireless communication system supporting soft vehicle to everything (soft V2X) communication includes at least one processor, and at least one computer memory operably connected to the at least one processor and configured to, when executed, cause the at least one processor to perform an operation, wherein the operation includes receiving status information including sensor values of a second apparatus, and transmitting information on a hazard situation of a road detected based on the sensor values, and wherein the hazard situation of the road is detected based on 1) change amounts between a first time point at which a change amount of the sensor values becomes larger than a threshold value and a second time point at which the change amount again becomes less than the threshold value, and 2) similarity between the sensor values before the first time point and after the second time point.

According to a sixth aspect of the present disclosure, a computer-readable storage medium includes at least one computer program that, when executed, causes the at least one processor to perform an operation including receiving status information including sensor values of a second apparatus, and transmitting information on a hazard situation of a road detected based on the sensor values, wherein the hazard situation of the road is detected based on 1) change amounts between a first time point at which a change amount of the sensor values becomes larger than a threshold value and a second time point at which the change amount again becomes less than the threshold value, and 2) similarity between the sensor values before the first time point and after the second time point.

According to an embodiment, based on an accumulated value of the change amounts between the first time point and the second time point being greater than a preset value, the hazard situation of the road may be detected to occur.

According to an embodiment, based on the similarity between the sensor values of the first time point and after the second time point being equal to or less than a threshold level, the hazard situation of the road may be detected not to occur.

According to an embodiment, information on the hazard situation of the road may include at least one of information for identifying the hazard situation, information indicating a type of the hazard situation, information on a time at which the hazard situation is detected, information indicating a region in which the hazard situation is detected, and information indicating a type of the region.

According to an embodiment, the method may further include, based on the hazard situation of the road being detected, transmitting a message for requesting additional information on the hazard situation to one or more third apparatuses, receiving the additional information from the one or more third apparatuses, based on the additional information, updating the information on the hazard situation of the road, and transmitting the updated information on the hazard situation of the road to the second apparatus.

According to an embodiment, the message may further include information for controlling the third apparatus, and the information for controlling the third apparatus includes at least one of information for controlling a sensor of the third apparatus required to obtain the additional information, information for controlling an operation of notifying the third apparatus of hazard, and information for controlling an operation of an application related to safety of the third apparatus.

According to an embodiment, additional information on the road may include at least one of movement path information, speed change information, a sensor value, sound information, and camera image information of the one or more third apparatuses.

According to an embodiment, the one or more third apparatuses may include an apparatus located in a region adjacent to the road, and a range of the region may be set differently based on at least one of severity and reliability of the hazard situation of the road.

According to an embodiment, the message for requesting the additional information may include at least one of at least one of information for identifying the hazard situation, information indicating a sensor value required in the first apparatus, and information for setting a collection period of the additional information.

According to an embodiment, the sensor values may include at least one of values indicating a position in a direction perpendicular to a driving direction of the second apparatus or a position in a Z-axis direction.

According to an embodiment, the first apparatus and the second apparatus may perform communication through a Uu interface between User Equipment and Radio Network System.

According to an embodiment, based on the hazard situation of the hazard being detected by the second apparatus, the status information may include information on the hazard situation of the road.

According to the present disclosure, a hazard situation of a road may be more efficiently detected.

According to the present disclosure, a hazard situation of a road may be more accurately detected through cooperative cognition between different apparatuses.

According to the present disclosure, users driving around may drive more safely by transmitting information on a hazard situation of a road to other apparatuses.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure.

FIG. 11 is a block diagram showing the configuration of a soft V2X device according to an embodiment of the present disclosure.

FIG. 17 is a flowchart showing an operation of a system according to the third method according to an embodiment of the present disclosure.

FIG. 27 is a diagram illustrating a message format for detecting a hazard situation according to an embodiment of the present disclosure.

FIG. 28 is a diagram for explaining a method of expressing a region where an event occurs based on coordinate values of EventPositionA and B.

FIG. 29 is a flowchart for explaining an operation of a first apparatus according to an embodiment of the present disclosure.

DETAILED DESCRIPTION

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto.

Figure 1:
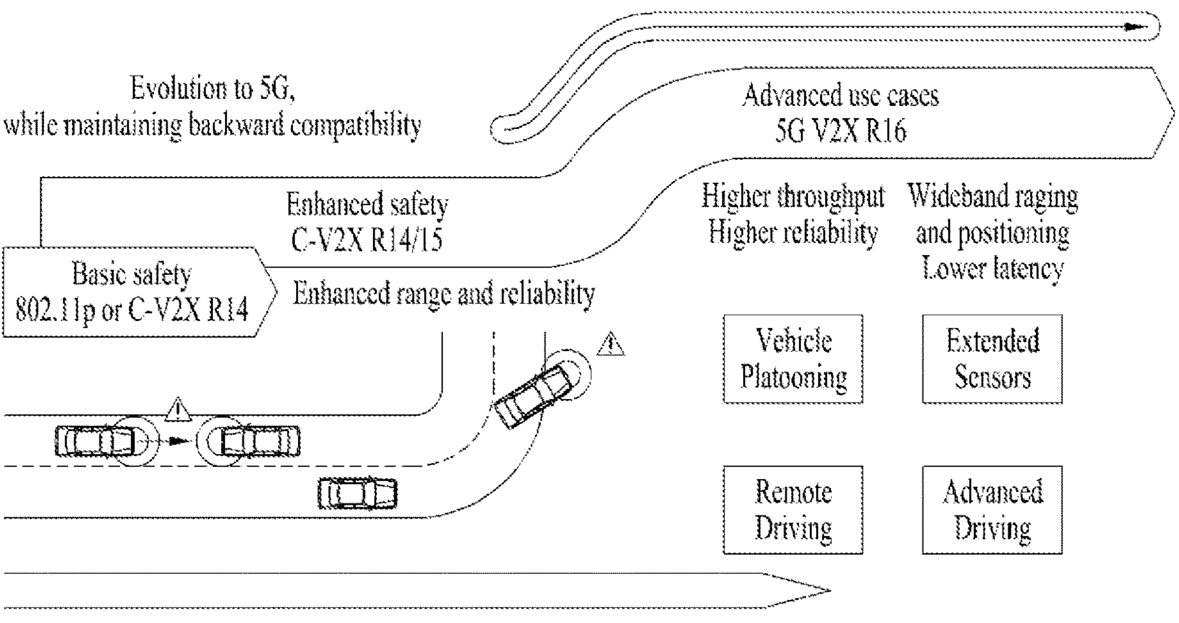
FIG. 1 is a diagram for explaining by comparing V2X communication based on RAT before NR and V2X communication based on NR.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic status information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

Figure 2:
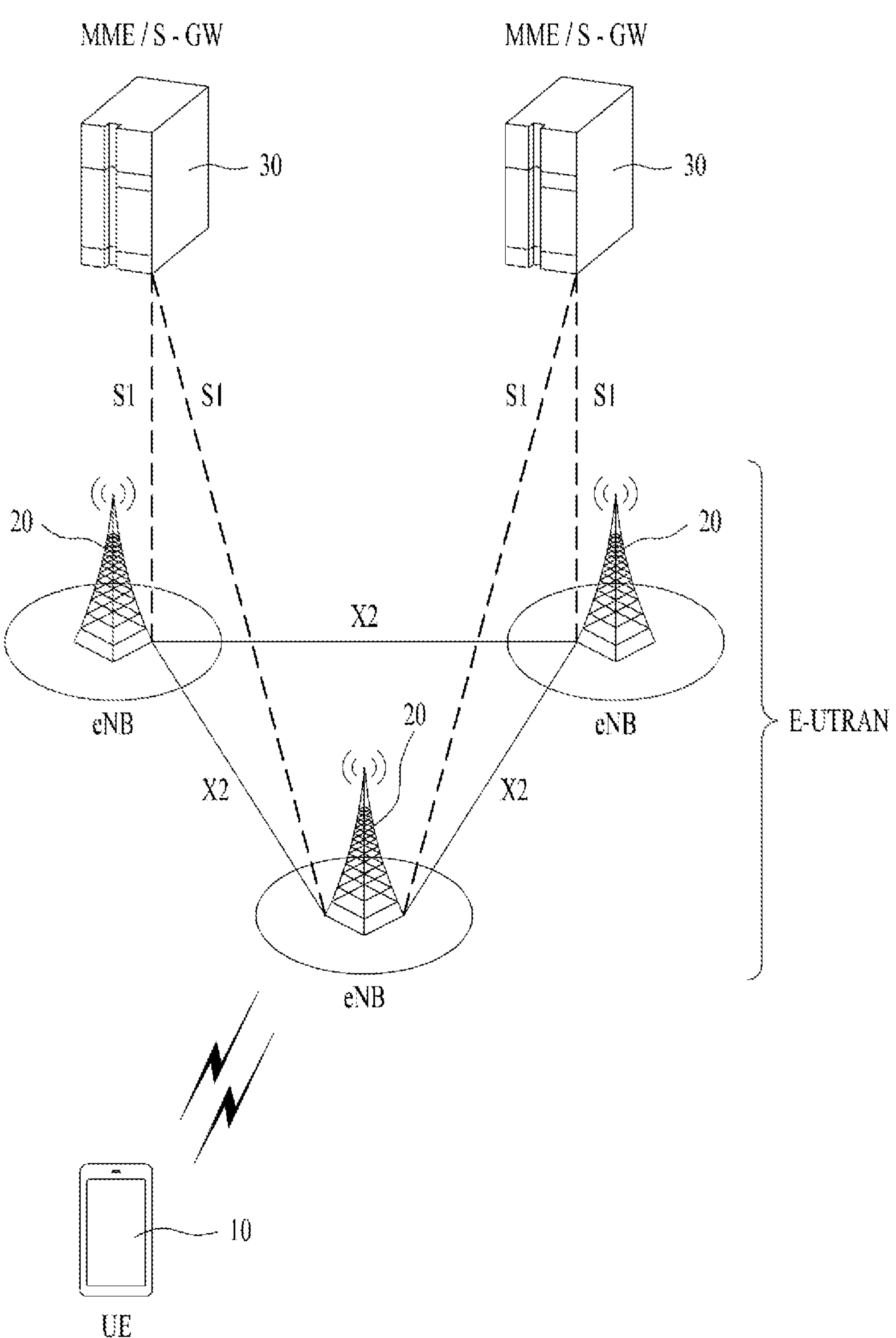
FIG. 2 illustrates the structure of an LTE system to which embodiment(s) are applicable

FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
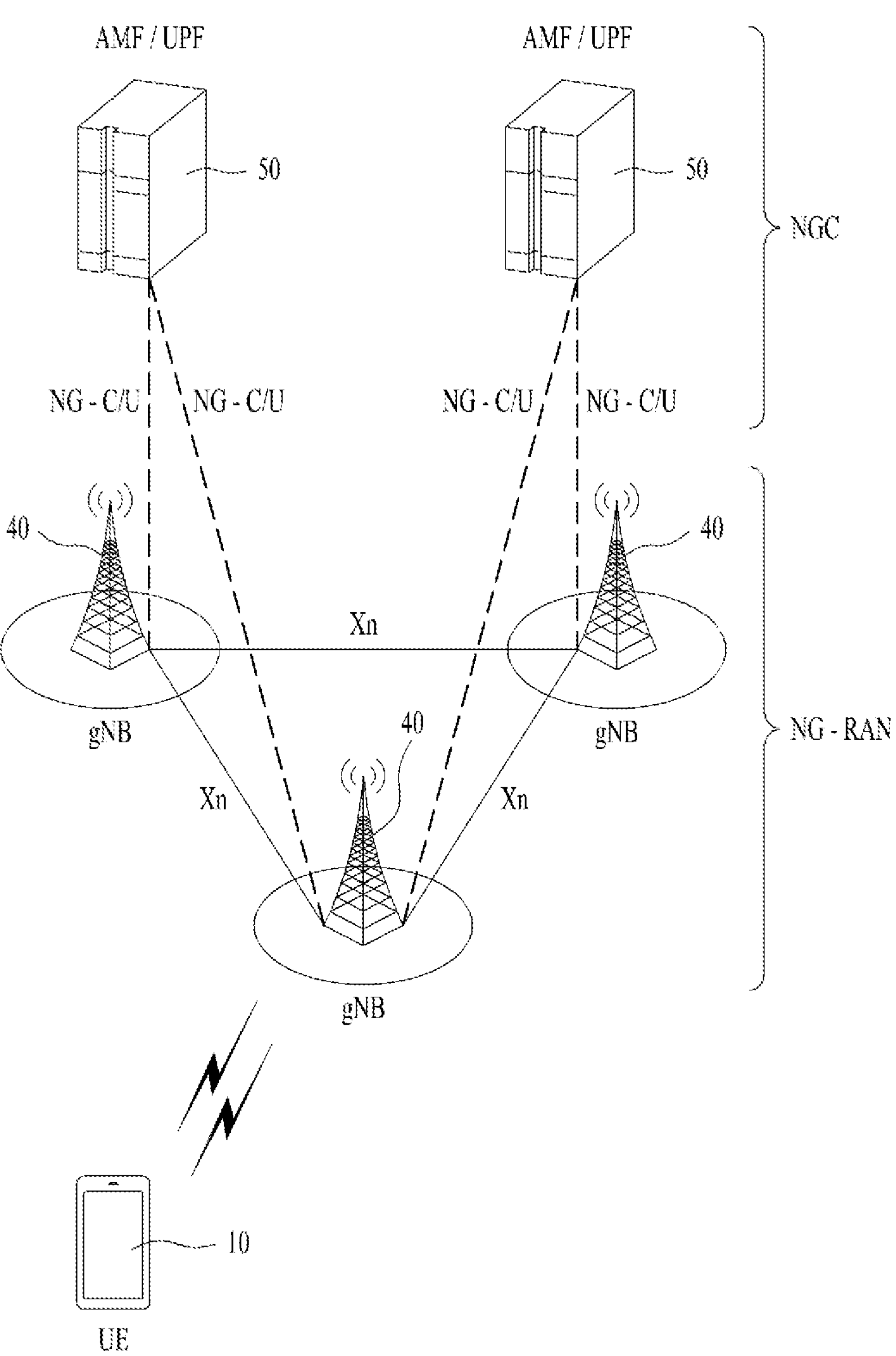
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
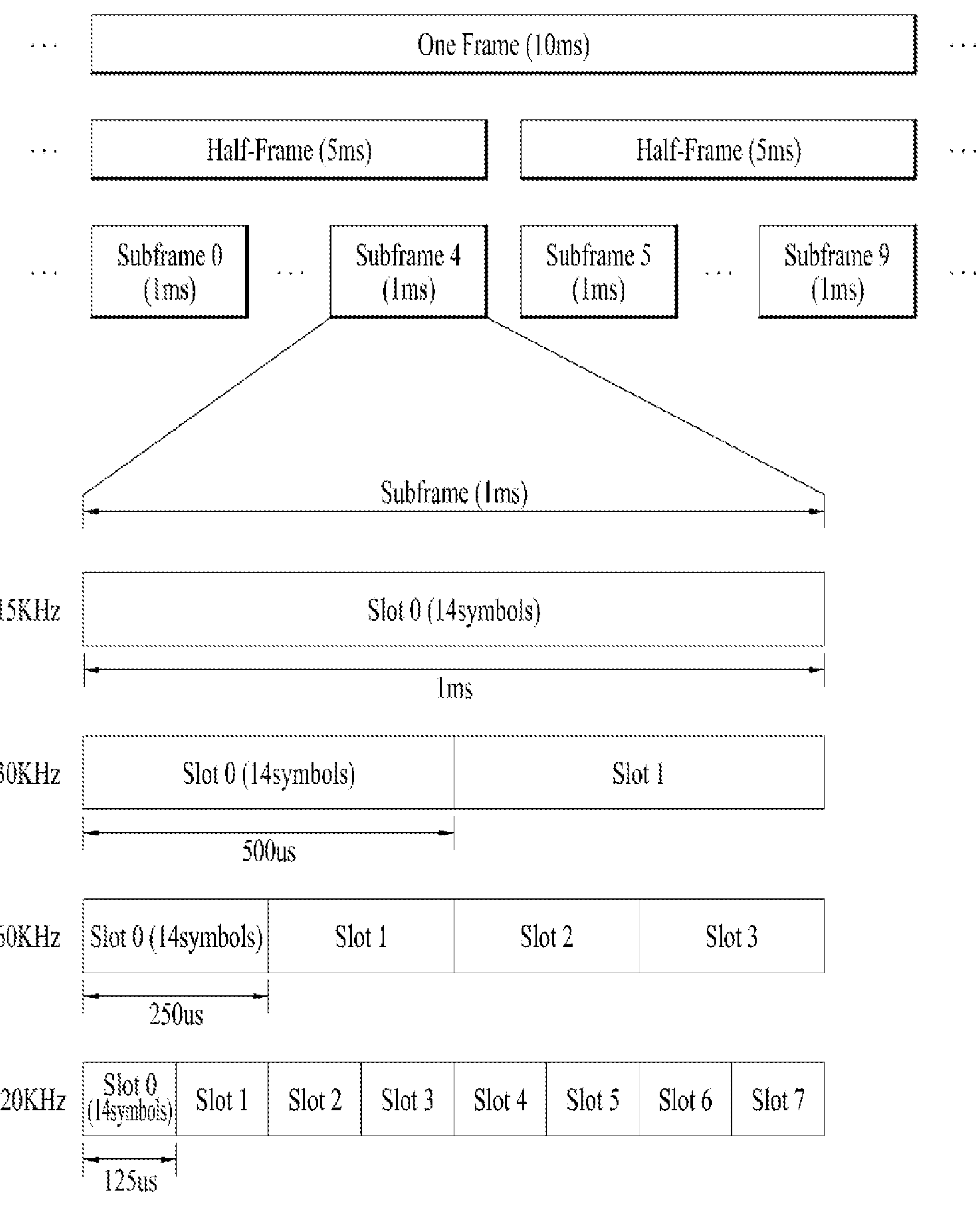
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2^u^) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHZ | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHZ | 60, 120, 240 kHz |

Figure 5:
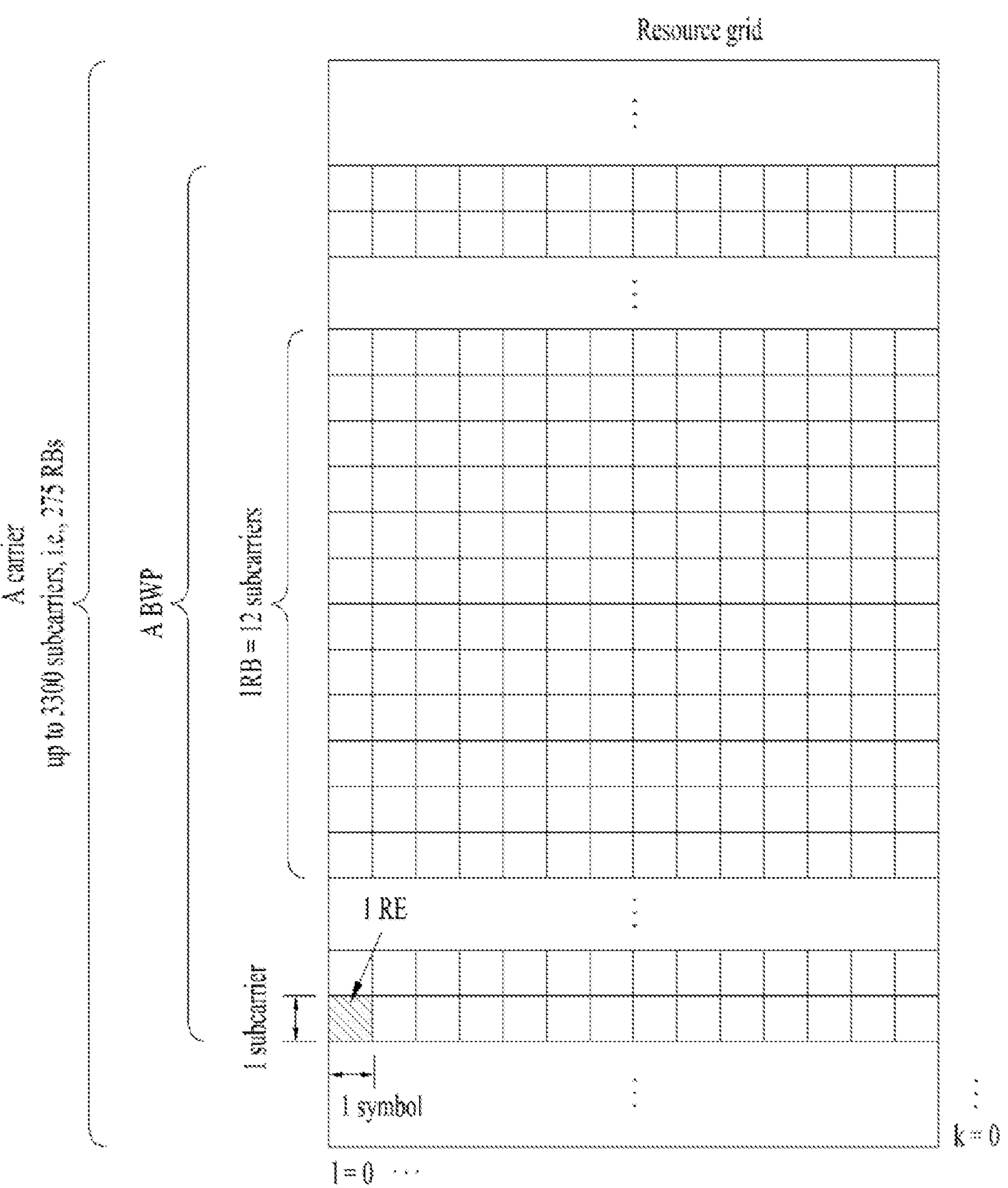
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
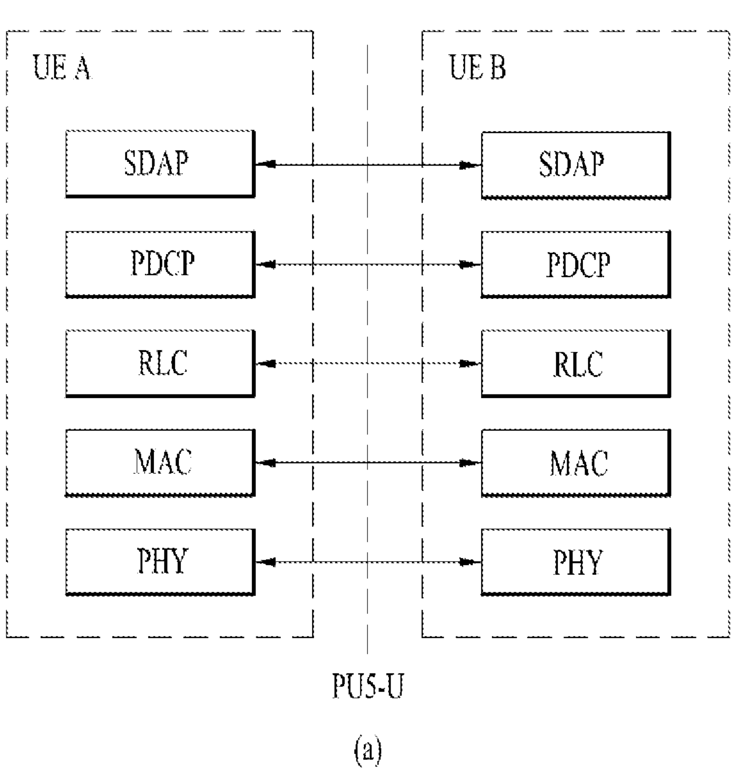
FIG. 6 illustrates a radio protocol architecture for SL communication.
Figure 6:
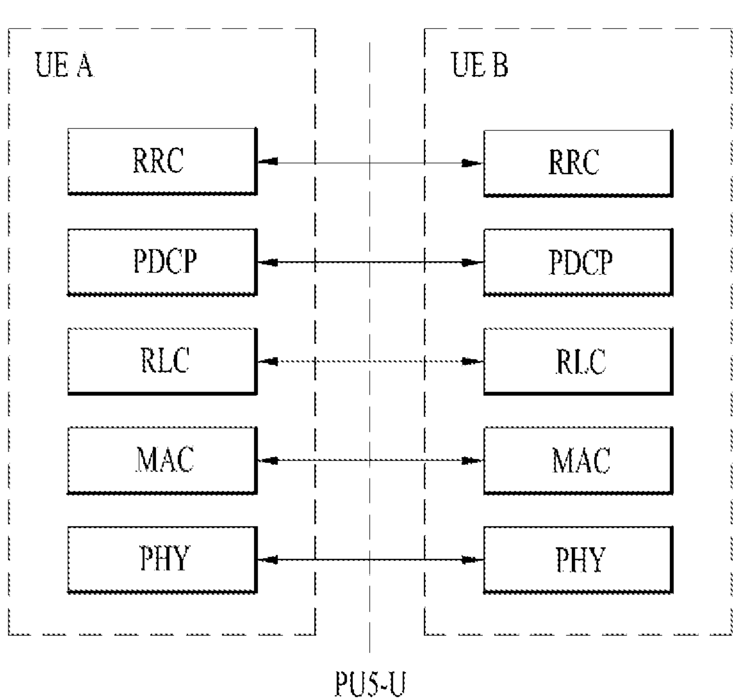

FIG. 6 illustrates a radio protocol architecture for SL communication. Specifically, FIG. 6-(*a*) shows a user plane protocol stack of NR, and FIG. 6-(*b*) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
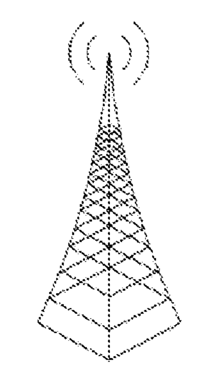
FIG. 7 illustrates UEs performing V2X or SL communication.
Figure 7:
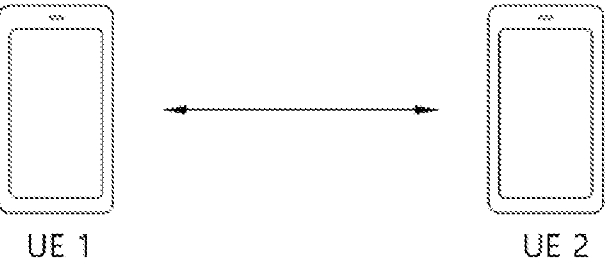

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
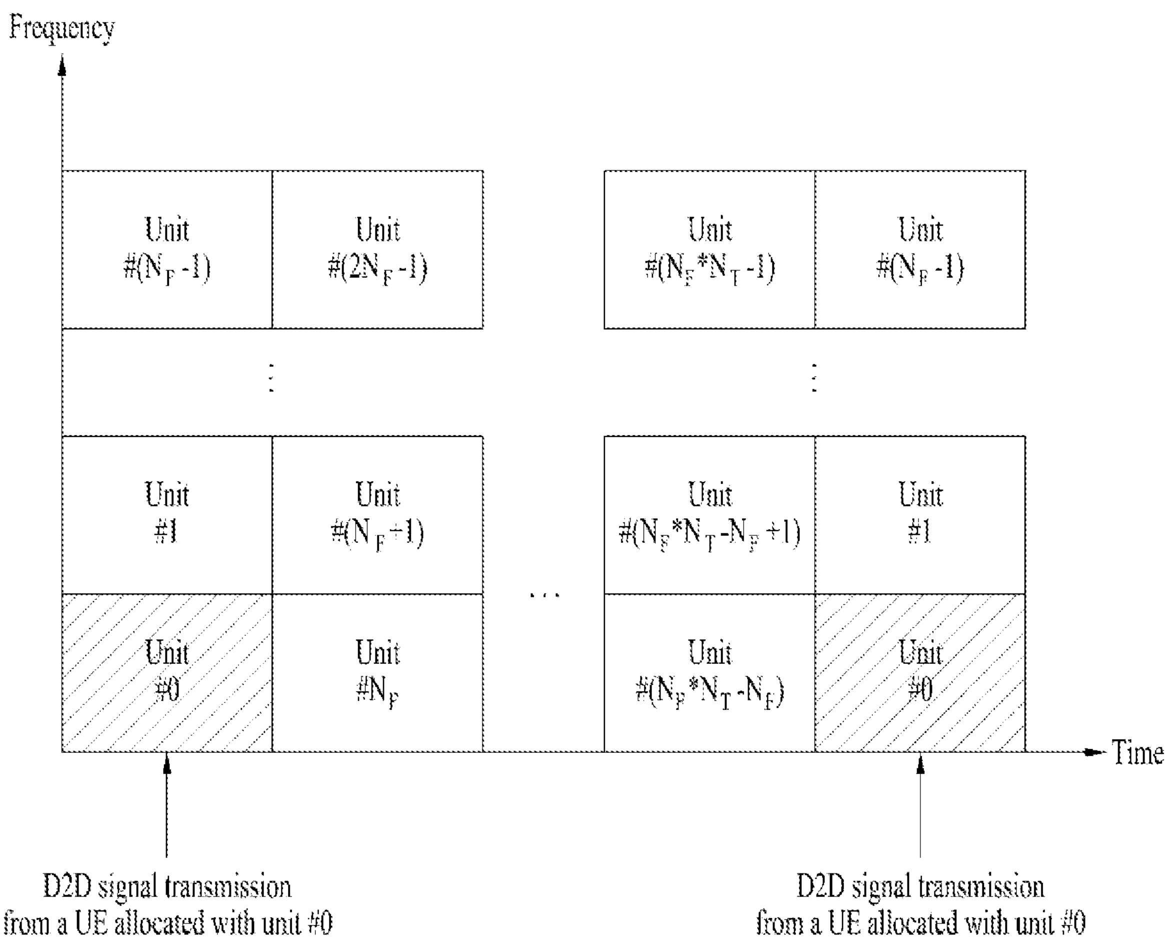
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2D, vehicle-to-pedestrian communication (V2P or P2V), and RSU-to-pedestrian communication (I2P or P2I). A vehicle, a BS, an RSU, a pedestrian, etc. as the subjects of vehicle communication are referred to as intelligent transport system (ITS) stations.

Figure 9:
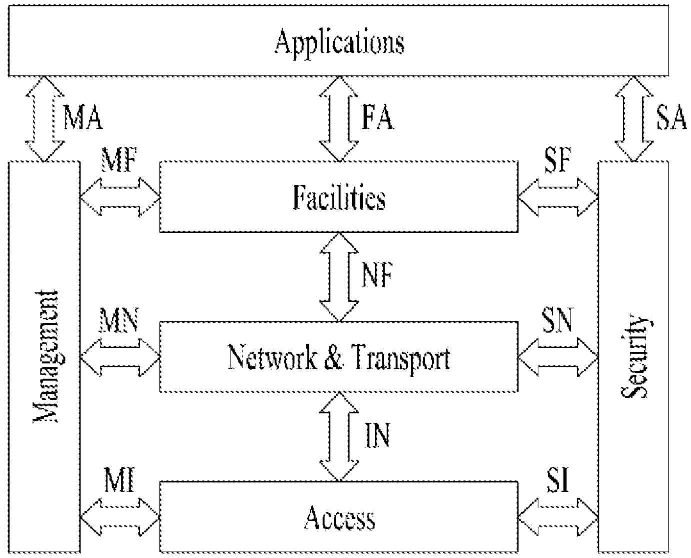
FIG. 9 is a diagram for explaining an ITS station reference architecture.

FIG. 9 is a diagram for explaining an ITS station reference architecture.

The ITS station reference architecture may include an access layer, a network & transport layer, a facilities layer, entities for security and management, and an application layer at the top. Basically, the ITS station reference architecture follows a layered OSI model.

Specifically, features of the ITS station reference architecture based on the OSI model are illustrated in FIG. 9. The access layer of the ITS station corresponds to OSI layer 1 (physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers. Each layer of the ITS station exchanges data transmitted or received through vehicle communication and additional information for various purposes through an interface. The abbreviations of various interfaces are described below.

MA: Interface between management entity and application layer

MF: Interface between management entity and facilities layer

MN: Interface between management entity and networking & transport layer

MI: Interface between management entity and access layer

FA: Interface between facilities layer and ITS-S applications

NF: Interface between networking & transport layer and facilities layer

IN: Interface between access layer and networking & transport layer

SA: Interface between security entity and ITS-S applications

SF: Interface between security entity and facilities layer

SN: Interface between security entity and networking & transport layer

SI: Interface between security entity and access layer

Figure 10:
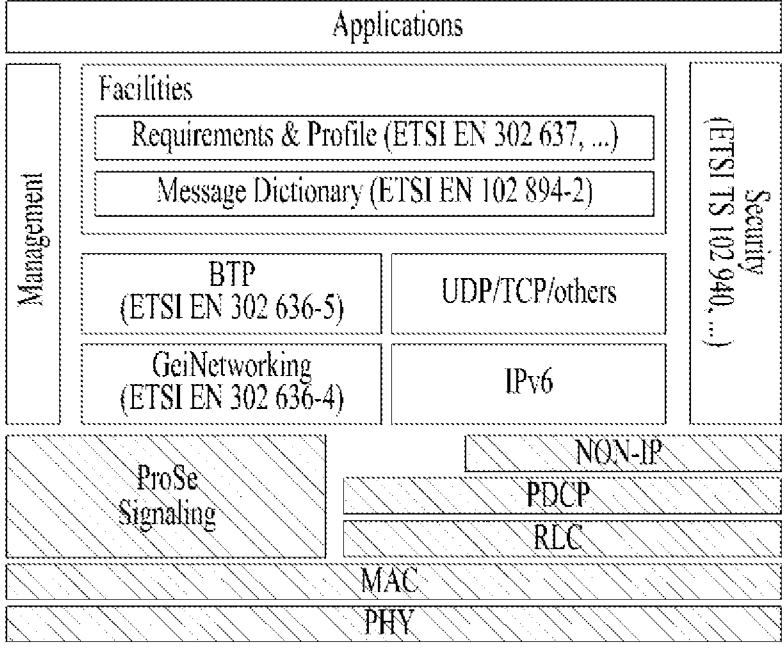
FIG. 10 illustrates an example of structure of an ITS station that may be designed and applied based on a reference architecture.
Figure 10:
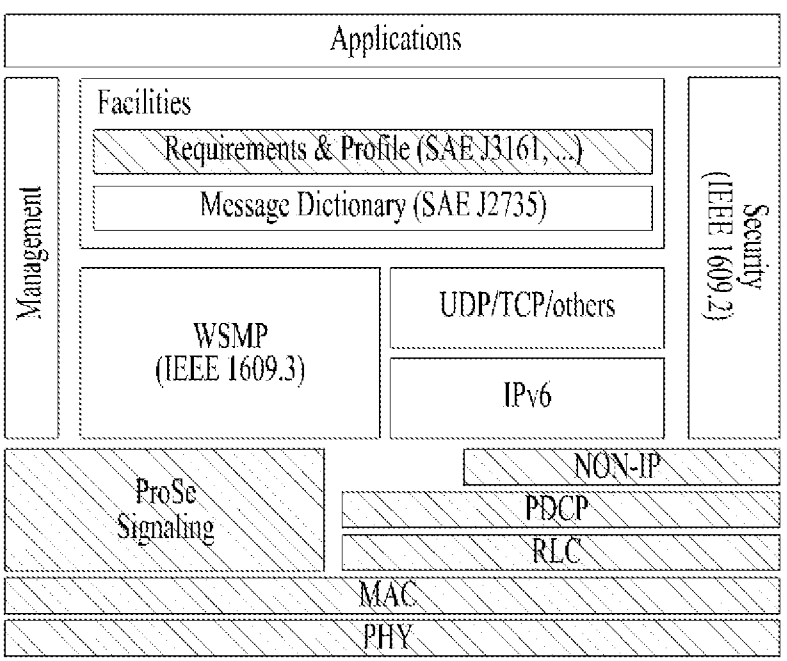

FIG. 10 illustrates an example of structure of an ITS station that may be designed and applied based on a reference architecture.

A main concept of the ITS station reference architecture is to allow each layer with a special function to process communication on a layer basis, between two end vehicles/users included in a communication network. That is, when a V2V message is generated, the data is passed through each layer downwards layer by layer in the vehicle and the ITS system (or other ITS-related UEs/systems), and a vehicle or ITS system (or other ITS-related UEs/systems) receiving the message passes the message upwards layer by layer.

The ITS system operating through vehicle communication and the network was organically designed in consideration of various access technologies, network protocols, communication interfaces, etc. to support various use-cases, and the roles and functions of each layer described below may be changed depending on a situation. The main functions of each layer will be briefly described.

The application later actually implements and supports various use-cases. For example, the application layer provides security, efficient traffic information, and other entertainment information.

The application layer controls an ITS station to which an application belongs in various manners or provides services by transferring a service message to an end vehicle/user/infrastructure through the access layer, the network & transport layer, and the facilities layer, which are lower layers of the application layer, by vehicle communication. In this case, the ITS application may support various use-cases. In general, these use-cases may be supported by grouping into other applications such as road-safety, traffic efficiency, local services, and infotainment. Application classification, use-cases, etc. may be updated when a new application scenario is defined. Layer management serves to manage and service information related to operation and security of the application layer, and the related information is transmitted and shared bidirectionally through an MA and an SA (or service access point (SAP), e.g., MA-SAP or SA-SAP). A request from the application layer to the facilities layer or a service message and related information from the facilities layer to the application layer may be delivered through an FA.

The facilities layer serves to support effective implementation of various use-cases defined in an application layer of a higher layer. For example, the facilities layer may perform application support, information support, and session/communication support.

The facilities layer basically supports the 3 higher layers of the OSI model, for example, a session layer, a presentation layer, and the application layer, and functions. Specifically, the facilities layer provides facilities such as application support, information support, and session/communication support, for the ITS. Here, the facilities mean components that provide functionality, information, and data.

The application support facilities support the operation of ITS applications (mainly generation of a message for the ITS, transmission and reception of the message to and from a lower layer, and management of the message). The application support facilities include a cooperative awareness (CA) basic service and a decentralized environmental notification (DEN) basic service. In the future, facilities entities for new services such as cooperative adaptive cruise control (CACC), platooning, a vulnerable roadside user (VRU), and a collective perception service (CPS), and related messages may be additionally defined.

The information support facilities provide common data information or a database to be used by various ITS applications and includes a local dynamic map (LDM).

The session/communication support facilities provide services for communications and session management and include an addressing mode and session support.

Facilities may be divided into common facilities and domain facilities.

The common facilities are facilities that provide common services or functions required for various ITS applications and ITS station operations, such as time management, position management, and service management.

The domain facilities are facilities that provide special services or functions required only for some (one or more) ITS applications, such as a DEN basic service for road hazard warning applications (RHW). The domain facilities are optional functions and are not used unless supported by the ITS station.

Layer management serves to manage and service information related to the operation and security of the facilities layer, and the related information is transmitted and shared bidirectionally through an MF and an SF (or MF-SAP and SF-SAP). The transfer of service messages and related information from the application layer to the facilities layer or from the facilities layer to the application layer is performed through an FA (or FA-SAP), and bidirectional service messages and related information between the facilities layer and the lower networking & transport layer are transmitted by an NF (or NF-SAP).

The network & transport layer servers to configure a network for vehicle communication between homogenous or heterogeneous networks through support of various transport protocols and network protocols. For example, the network & transport layer may provide Internet access, routing, and vehicle networking using Internet protocols such as TCP/UDP+IPv6 and form a vehicle network using a basic transport protocol (BTP) and GeoNetworking-based protocols. In this case, networking using geographic position information may also be supported. A vehicle network layer may be designed or configured depending on technology used for the access layer (access layer technology-independently) or regardless of the technology used for the access layer (access layer technology-independently or access layer technology agnostically).

Functionalities of the European ITS network & transport layer are as follows. Basically, functionalities of the ITS network & transport layer are similar to or identical to those of OSI layer 3 (network layer) and layer 4 (transport layer) and have the following characteristics.

The transport layer is a connection layer that delivers service messages and related information received from higher layers (the session layer, the presentation layer, and the application layer) and lower layers (the network layer, the data link layer, and the physical layer). The transport layer serves to manage data transmitted by an application of the ITS station so that the data accurately arrives at an application process of the ITS station as a destination. Transport protocols that may be considered in European ITS include, for example, TCP and UDP used as legacy Internet protocols as illustrated in FIG. 11, and there are transport protocols only for the ITS, such as the BTS.

The network layer serves to determine a logical address and a packet forwarding method/path and add information such as the logical address of a destination and the forwarding path/method to a header of the network layer in a packet received from the transport layer. As an example of the packet method, unicast, broadcast, and multicast between ITS stations may be considered. Various networking protocols for the ITS may be considered, such as GeoNetworking, IPv6 networking with mobility support, and IPv6 over GeoNetworking. In addition to simple packet transmission, the GeoNetworking protocol may apply various forwarding paths or transmission ranges, such as forwarding using position information about stations including vehicles or forwarding using the number of forwarding hops.

Layer management related to the network & transport layer serves to manage and provide information related to the operation and security of the network & transport layer, and the related information is transmitted and shared bidirectionally through an MN (or MN-SAP) and an SN (or SN-SAP). Transmission of bidirectional service messages and related information between the facilities layer and the networking & transport layer is performed by an NF (or NF-SAP), and service messages and related information between the networking & transport layer and the access layer are exchanged by an IN (or IN-SAP).

A North American ITS network & transport layer supports IPv6 and TCP/UDP to support existing IP data like Europe, and a wave short message protocol (WSMP) is defined as a protocol only for the ITS.

A packet structure of a wave short message (WSM) generated according to the WSMP includes a WSMP header and WSM data carrying a message. The WSMP header includes Version, PSID, WSMP header extension fields, WSM WAVE element ID, and Length.

Version is defined by a WsmpVersion field indicating an actual WSMP version of 4 bits and a reserved field of 4 bits. PSID is a provider service identifier, which is allocated according to an application in a higher layer and helps a receiver to determine an appropriate higher layer. Extension fields is a field for extending the WSMP header, and includes information such as a channel number, a data rate, and transmit power used. WSMP WAVE element ID specifies the type of a WSM to be transmitted. Length specifies the length of transmitted WSM data in octets through a WSMLength field of 12 bits, and the remaining 4 bits are reserved. LLC Header allows IP data and WSMP data to be transmitted separately and is distinguished by Ethertype of a SNAP. The structures of the LLC header and the SNAP header are defined in IEEE802.2. When IP data is transmitted, Ethertype is set to 0x86DD in the LLC header. When WSMP is transmitted, Ethertype is set to 0x88DC in the LLC header. The receiver identifies Ethertype. If Ethertype is 0x86DD, the receiver transmits upward the packet to an IP data path, and if Ethertype is 0x88DC, the receiver transmits upward the packet to a WSMP path.

The access layer serves to transmit a message or data received from a higher layer on a physical channel. As access layer technologies, ITS-G5 vehicle communication technology based on IEEE 802.11p, satellite/broadband wireless mobile communication technology, 2G/3G/4G (long-term evolution (LTE), etc.)/5G wireless cellular communication technology, cellular-V2X vehicle-dedicated communication technologies such as LTE-V2X and NR-V2X (new radio), broadband terrestrial digital broadcasting technology such as DVB-T/T2/ATSC3.0, and GPS technology may be applied.

A data link layer is a layer that converts a physical line between adjacent nodes (or between vehicles) with noise into a communication channel without transmission error, for use in the higher network layer. The data link layer performs a function of transmitting/delivering/forwarding L3 protocols, a framing function of dividing data to be transmitted into packets (or frames) as transmission units and grouping the packets, a flow control function of compensating for a speed difference between a transmitter and a receiver, and a function of (because there is a high probability that an error and noise occurs randomly in view of the nature of a physical transmission medium) detecting a transmission error and correcting the error or detecting a transmission error based on a timer and an ACK signal by a transmitter in a method such as automatic repeat request (ACK) and retransmitting a packet that has not been correctly received. In addition, to avoid confusion between packets or ACK signals, the data link layer performs a function of assigning a sequence number to the packets and the ACK signals, and a function of controlling establishment, maintenance, and disconnection of a data link between network entities, and data transmission between network entities. The main functions of logical link control (LLC), radio resource control (RRC), packet data convergence protocol (PDCP), radio link control (RLC), medium access control (MAC), and multi-channel operation (MCO) included in the data link layer of FIG. 11 will be described below.

An LLC sub-layer enables the use of different lower MAC sub-layer protocols, and thus enables communication regardless of network topology. An RRC sub-layer performs functions such as broadcasting of cell system information required for all UEs within a cell, management of delivery of paging messages, management (setup/maintenance/release) of RRC connection between a UE and an E-UTRAN, mobility management (handover), transmission of UE context between eNodeBs during handover, UE measurement reporting and control therefor, UE capability management, temporary assignment of a cell ID to a UE, security management including key management, and RRC message encryption. A PDCP sub-layer may performs functions such as IP packet header compression in a compression method such as robust header compression (ROHC), cyphering of a control message and user data, data integrity, and data loss prevention during handover. RLC sub-layer delivers a packet received from the higher PDCP layer in an allowed size of the MAC layer through packet segmentation/concatenation, increases data transmission reliability by transmission error and retransmission management, checks the order of received data, reorders data, and checks redundancy. A MAC sub-layer performs functions such as control of the occurrence of collision/contention between nodes for use of shared media among multiple nodes, matching a packet delivered from the higher layer to a physical layer frame format, assignment and identification of the address of the transmitter/receiver, detection of a carrier, collision detection, and detection of obstacles on the physical medium. An MCO sub-layer enables efficient provision of various services on a plurality of frequency channels. The main function of MCO sub-layer is to effectively distribute traffic load of a specific frequency channel to other channels to minimize collision/contention of communication information between vehicles in each frequency channel.

The physical layer is the lowest layer in the ITS layer architecture. The physical layer defines an interface between a node and a transmission medium and performs modulation, coding, and mapping of a transport channel to a physical channel, for bit transmission between data link layer entities and informs the MAC sub-layer of whether a wireless medium is busy or idle by carrier sensing or clear channel assessment (CCA).

A soft V2X system may be a system in which a soft V2X server receives a VRU message or a personal safety message (PSM) from a vulnerable road user (VRU) or a V2X vehicle and transfers information on a neighbor VRU or vehicle based on the VRU message or the PSM message or may analyze a road condition, etc. on which neighbor VRUs or vehicles move and may transmit a message informing a neighbor VRU or vehicle of a collision warning, etc. based on the analyzed information (e.g., through a downlink signal) via V2X communication using a UU interface. Here, the VRU message may be a message transmitted to the soft V2X server through the UU interface, and may include mobility information about the VRU, such as a position, a movement direction, a movement path, and a speed of the VRU. That is, the soft V2X system may use a method of receiving mobility information of VRUs and/or vehicles related to V2X communication through the UU interface and controlling a driving route or a VRU movement flow of the VRU, etc. based on the mobility information received by the softV2X server, such as a network. The soft V2X system may be configured in relation to V2N communication.

User equipment or pedestrian equipment (VRU device) that is difficult to perform direct communication (PC5, DSRC) related to V2X communication can provide or receive driving information and mobility information to nearby vehicles or VRUs through the soft V2X system based on the UU interface. Through this, the user equipment or pedestrian equipment (VRU device) that is difficult to perform the direct communication (PC5, DSRC) can be protected from surrounding vehicles.

Embodiment

When a pothole is formed on a road, when animal carcasses or fragments of a traffic accident exist on a road, when a traffic light is out of order, or when road is damaged, driving on the road may be hindered. Therefore, in order to remove the cause that interferes with driving on the road, road maintenance/repair companies identify and repair the hazard situation of the road by receiving a report or using self-detection technology. When a vehicle-to-everything (V2X) device detects (or recognizes) a hazard situation on the road, the V2X device may inform surrounding devices of the hazard situation on the road through a DENM message. However, since the above methods are only one-off, the methods do not help in immediate road maintenance.

Accordingly, in the present disclosure, a soft V2X system detects the hazard situation of the road and informs users traveling around the road of the hazard state of the road to protect the safety of users. The method for detecting a hazard situation on the road includes a method for detecting a hazard situation by a soft V2X device, a method for recognizing and detecting a driving state of soft V2X devices by a soft V2X server, and finally, a method for receiving information on a hazard state of the road from a 3$^{rd}$ party server.

In order to detect the severity of the hazard situation of the road to achieve the stability of a service, the present disclosure proposes a method of double-checking an area including a corresponding road by a soft V2X system. When a hazard situation on the road is detected, the soft V2X server may receive additional information about the corresponding area as well as information informing of the hazard situation in the corresponding area from soft V2X devices traveling in the corresponding area. Accordingly, the soft V2X server may more accurately detect a hazard situation in the corresponding area in real time, and may transfer information about the hazard situation to the soft V2X device again. In addition, the soft V2X server may request a third-party server to transmit additional information of the corresponding area, and may receive additional information of the corresponding area from a CCTV or a petrol vehicle.

In addition, the present disclosure proposes an additional configuration of the soft V2X system for supporting the above-described methods, and proposes a technology for detecting a hazard situation on the road by a soft V2X device or server. In addition, the present disclosure additionally proposes a configuration of a soft V2X system for double-checking a hazard situation on the road, and a procedure for transmitting and receiving a message applied to the above-described methods.

FIG. 11 is a block diagram showing the configuration of a soft V2X device. Referring to FIG. 11, an IMU & sensor input port block 110 collects (or obtains) information through an inertial measurement unit (IMU) sensor and an additional sensor of a UE such as a smartphone, and transmits the collected information to a hazard recognition block and a double check block. In addition, the soft V2X device may receive information on a hazard situation on a road and a double check request message from a soft V2X server through a V2X input block 120.

A hazard recognition block 140 recognizes (or detects) a hazard situation on the road using location information of the IMU sensor and sensor information of the smartphone. In addition, the hazard recognition block 140 may receive information about a hazard situation on the road from the soft V2X server and drive more sensors in an area adjacent to the corresponding road to identify the hazard situation. In addition, the hazard recognition block 140 transfers information about the recognized event (e.g., event type or event level) to an event processing block 160. In this case, the event may mean a hazard situation on the road.

The double check block 150 performs an operation of checking a hazard situation on the road once again. When receiving information about the hazard situation on the road from the soft V2X server, the double check block 150 may more accurately detect a situation around the corresponding road according to a request of a soft V2X server, and transfer information about the detected hazard situation to the event processing block 160. The double check block 150 may transfer information on the recognized hazard situation to the hazard recognition block 140 to more accurately recognize the hazard situation on the road.

The event processing block 160 informs the soft V2X device of information about the hazard situation on the road based on event information received by the hazard recognition block 160, adjusts a transmission period of a soft V2X signal transmitted and received to reduce a risk level, and also supports adjustment of the performance of the soft V2X device such as a GPS and an LCD as much as possible and avoids risk in order to reduce power consumption. In addition, the event processing block 160 may transfer additional information about the hazard situation of the road requested through the V2X modem to the soft V2X server.

Hereinafter, the expression of detecting a hazard situation on the road may be used interchangeably with the expression of recognizing/detecting a hazard situation on the road. Information on a hazard situation may be interchangeably used with information on hazard, information on a hazard state, information on a hazard state, or information on an event.

A method of detecting a hazard situation on the road in a soft V2X system may include the following three methods.

Figure 12:
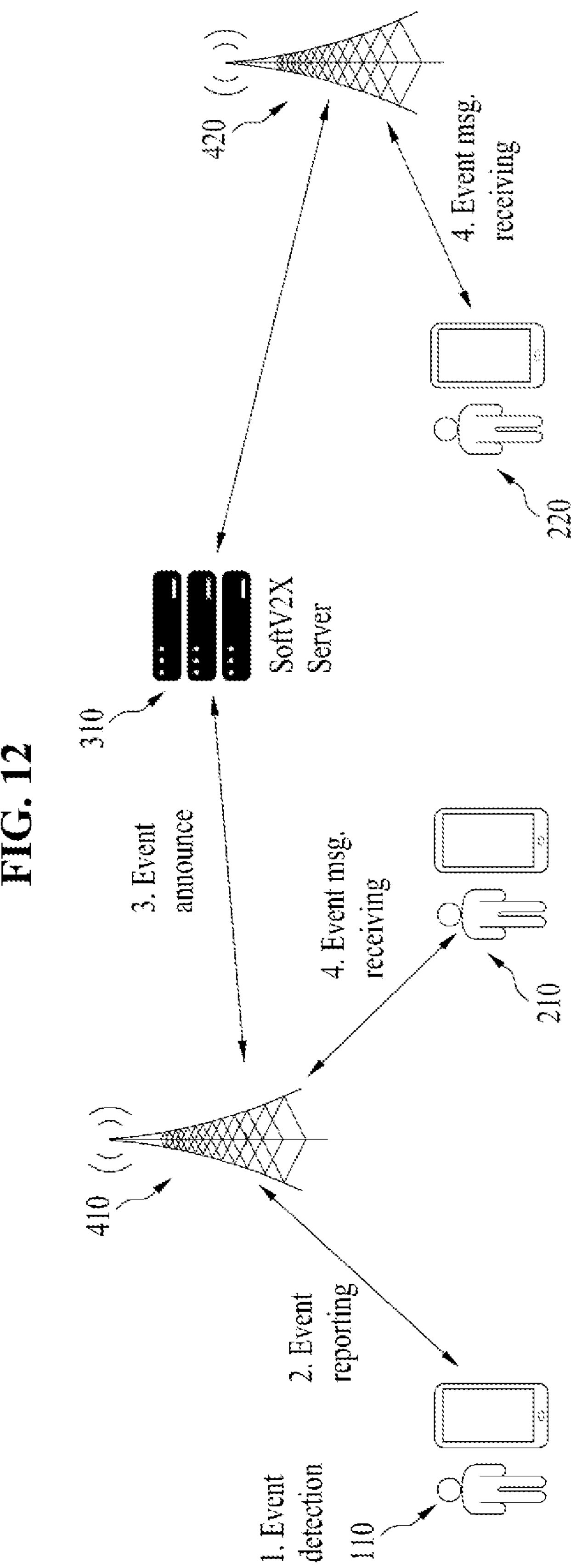
FIG. 12 is a diagram showing a system configuration in a first method according to an embodiment of the present disclosure.

A first method is a method in which the soft V2X device directly detects a hazard situation on the road. FIG. 12 is a diagram showing a system configuration in the first method. The soft V2X device 110 identifies a hazard factor on the road and transfers information on the hazard factor on the road through a message for event reporting in addition to the existing soft V2X message. The soft V2X server 310 may protect the safety of soft V2X devices by transferring received information to soft V2X devices 210 located nearby. Additionally, the soft V2X server 310 provides a safety service to users of other systems by transferring information on hazard on the road to a surrounding third-party server.

Figure 13:
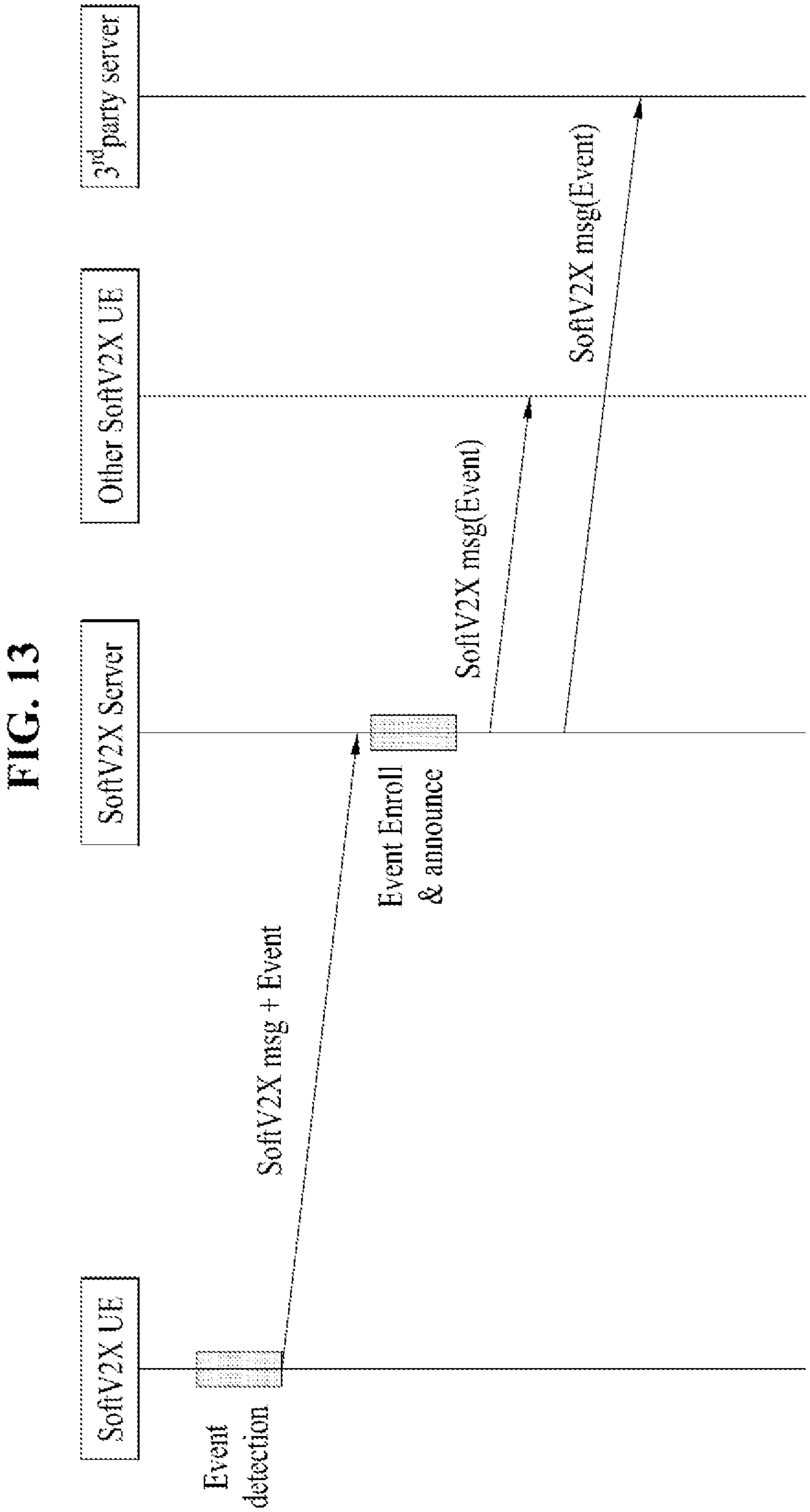
FIG. 13 is a flowchart showing an operation of a system according to the first method according to an embodiment of the present disclosure.

FIG. 13 is a flowchart showing an operation of a system according to the first method. The soft V2X device detecting an event may insert event information in addition to the existing soft V2X message and transmit the information to the soft V2X server. As described above, the event may mean a hazard situation on a road, and the event information may mean information on the hazard situation on the road. The soft V2X server may add event information received from the soft V2X device to an event list and retransmit the event information to soft V2X devices located in an area adjacent to the corresponding road. In addition, the soft V2X server may transfer event information to a third-party server such as the road management corporation that manages the corresponding area. The soft V2X server may transfer event information to the third-party server such that users located around the area in which the event occurs may safely travel.

The second method is a method of detecting a hazard situation on the road by a soft V2X server.

Figure 14:
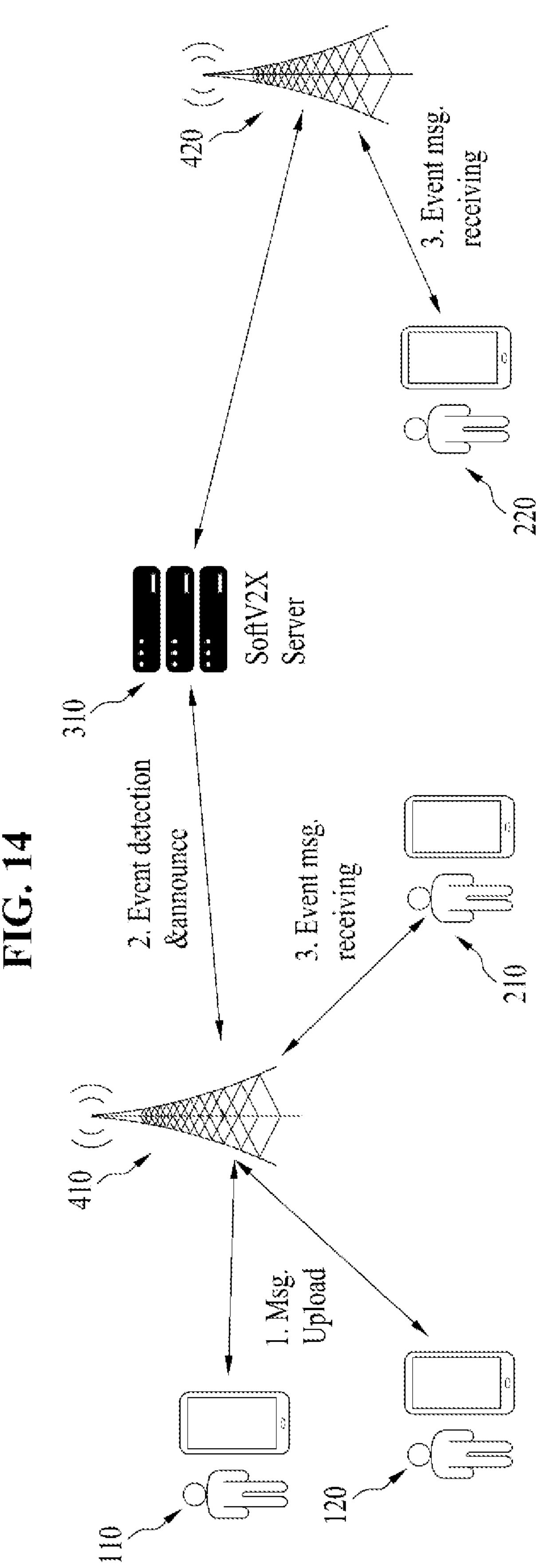
FIG. 14 is a diagram showing a system configuration in a second method according to an embodiment of the present disclosure.

FIG. 14 is a diagram showing a system configuration in the second method. Referring to FIG. 14, conventional soft V2X devices 110 and 120 may periodically transmit soft V2X messages to a soft V2X server 310 as in the conventional art. The soft V2X message may include status information of soft V2X devices, and the status information may include sensor values of soft V2X devices. In some embodiments, the sensor value may be referred to as sensor data or sensor information. The soft V2X server 310 may analyze the information (included in the soft V2X message) received from the soft V2X devices 110 and 120 to detect a hazard situation on the road. Thereafter, the soft V2X server 310 may protect the safety of users located around the corresponding road by transmitting information on the hazard situation on the road to the soft V2X devices 110, 120, 210, and 220. In addition, the soft V2X server 310 transfers information about a hazard situation on the road to a surrounding third-party server to provide a safety service to users of other systems.

Figure 15:
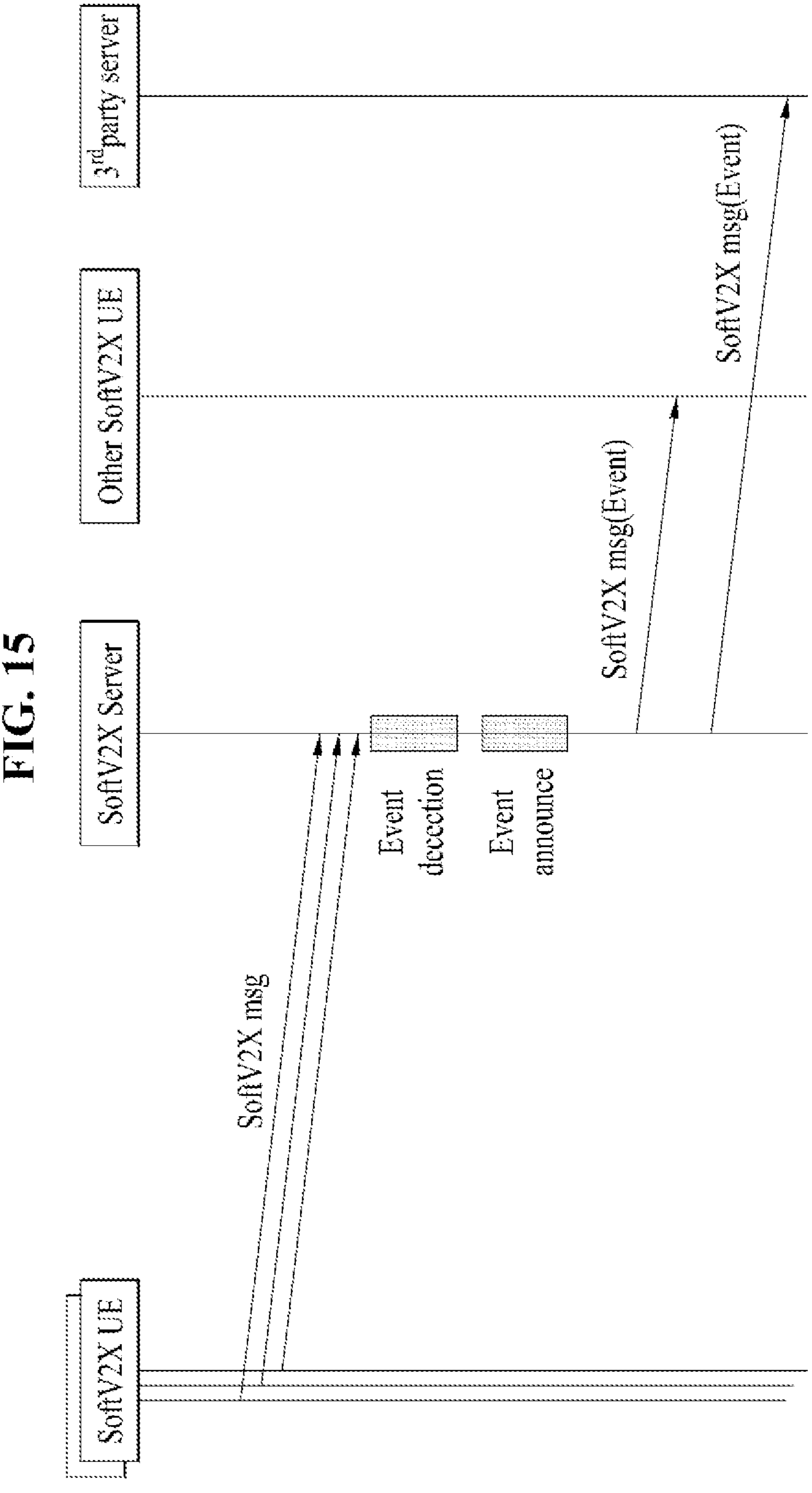
FIG. 15 is a flowchart showing an operation of a system according to a second method according to an embodiment of the present disclosure.

FIG. 15 is a flowchart showing an operation of a system according to the second method. Soft V2X devices may periodically transmit status information thereof to a soft V2X server as in the conventional case. The soft V2X server may analyze status information received from soft V2X devices to detect an event occurring in a specific area (i.e., a hazard situation in a specific area). Thereafter, the soft V2X server may register the detected event in an event list and transmit information on the detected event (i.e., information on a hazard situation) to soft V2X devices located nearby. In addition, the soft V2X server may transmit information about the event to a third-party server such as the road management corporation that manages an area in which the event is detected.

The third method is a method of receiving information about the hazard situation of the road from a server (third-party server) of another system that manages the road.

Figure 16:
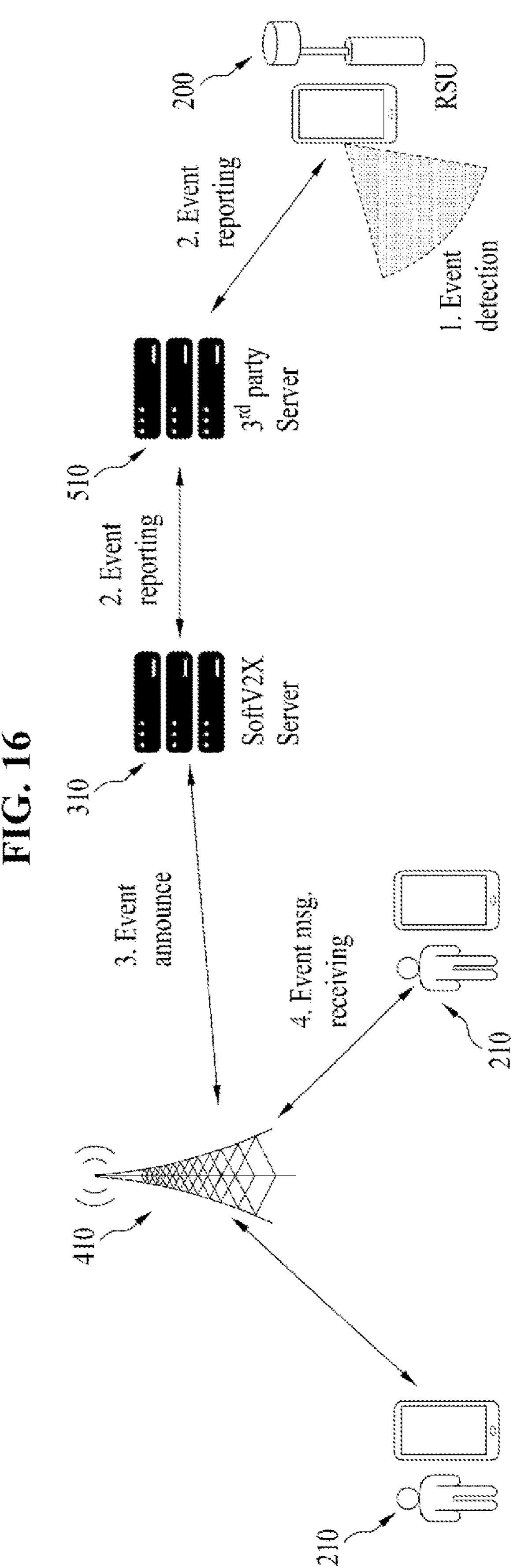
FIG. 16 is a diagram showing a system configuration in a third method according to an embodiment of the present disclosure.

FIG. 16 is a diagram showing a system configuration in the third method. Referring to FIG. 16, when a road side unit (RSU) 200 managing a road detects a hazard situation on the road, a third-party server 510 receives related information from the RSU 200 and recognizes the hazard situation on the road. The soft V2X server 310 may periodically receive information about a hazard situation on the road from the third-party server 510. Then, the soft V2X server 310 transmits the information about the hazard situation of the road received from the third-party server 510 back to the soft V2X devices 210 to protect the safety of users.

Figure 17:
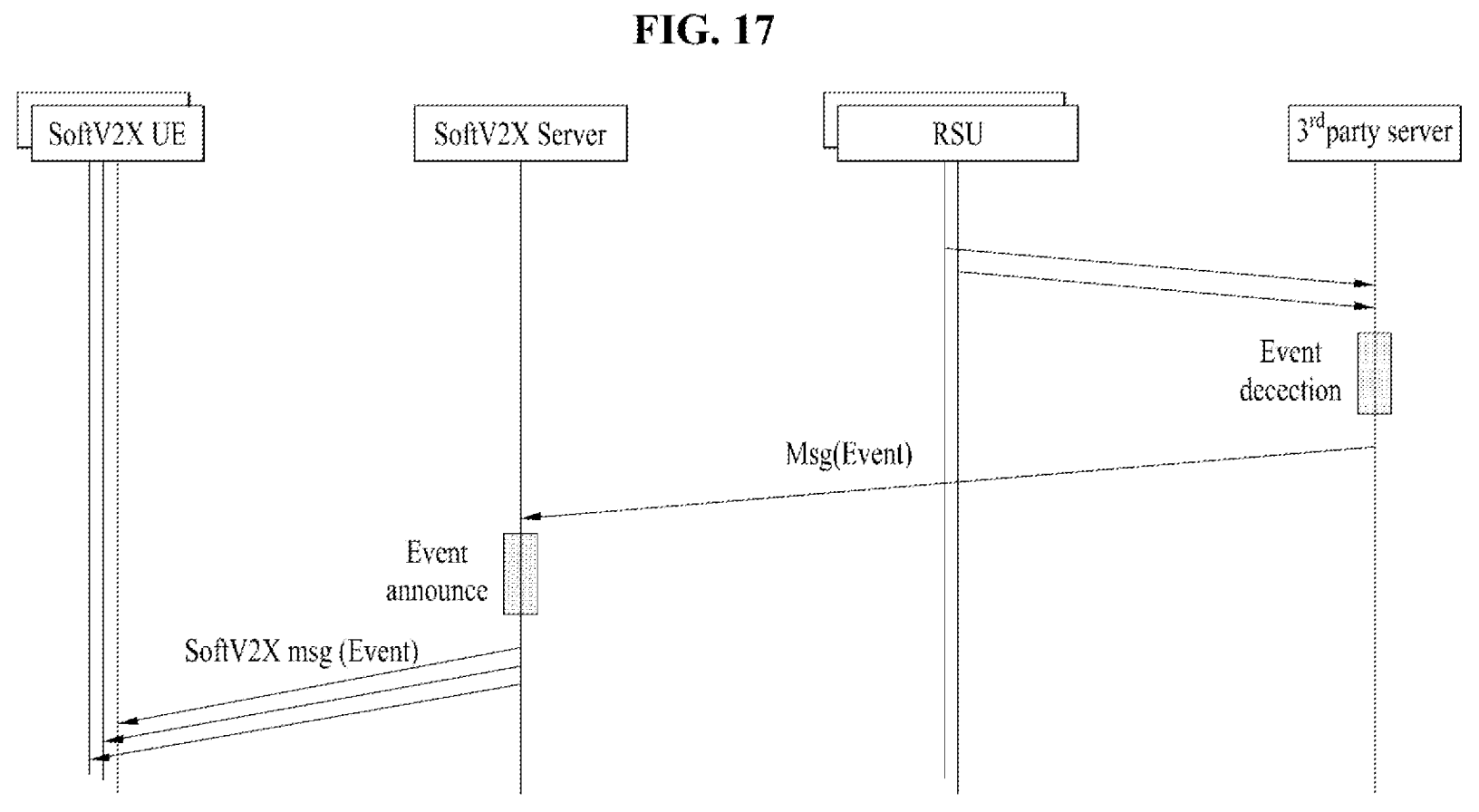

FIG. 17 is a flowchart showing an operation of a system according to the third method. A third-party server (for example, the road management corporation) identifies a hazard situation on a road through the RSU that manages a specific area or a CCTV of a management vehicle, and transmits information about the hazard situation of the identified road through a soft 2X server. The soft V2X server may register the hazard situation of the road as an event based on the information received from the third-party server, and transmit information on hazard of the corresponding road to the soft V2X devices located around the road in which the hazard situation occurs.

Figure 18:
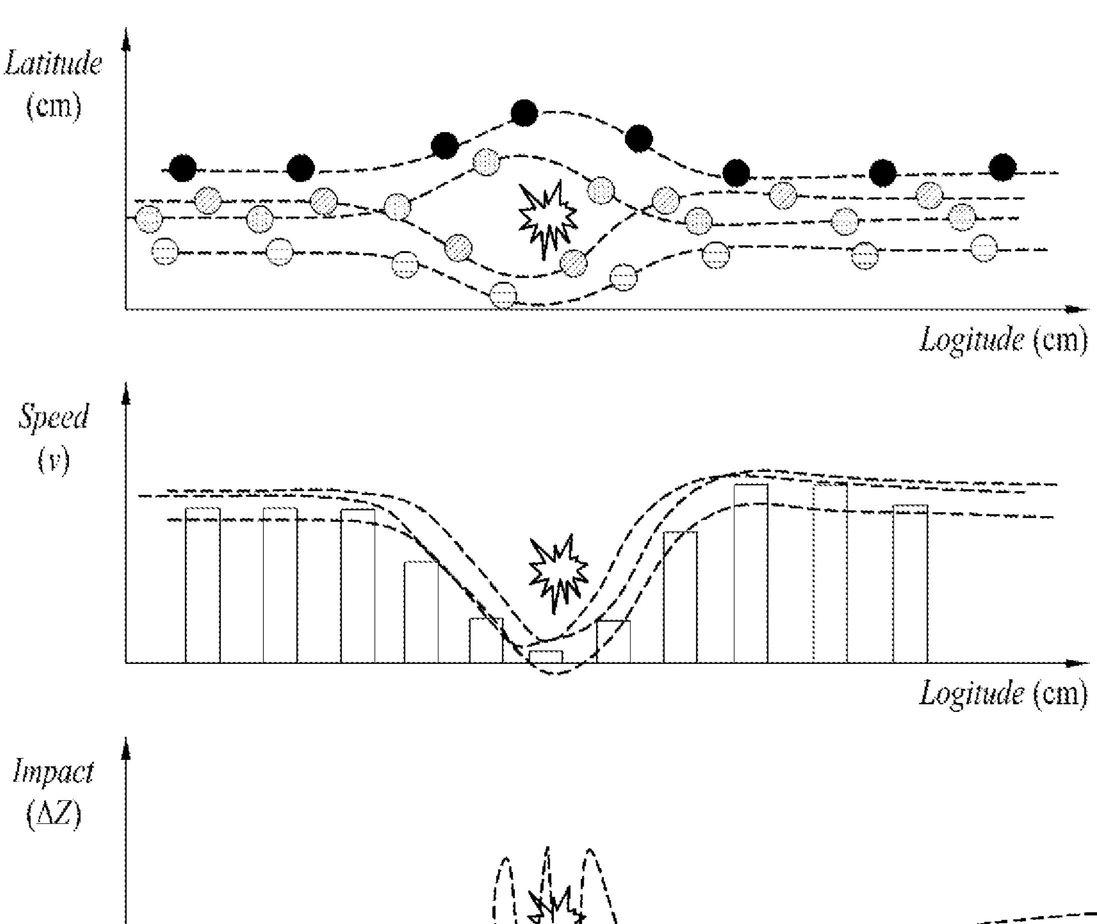
FIG. 18 is a diagram for explaining an operation of a hazard recognition block according to an embodiment of the present disclosure.

FIG. 18 is a diagram for explaining an operation of a hazard recognition block according to an embodiment of the present disclosure. The operation shown in FIG. 18 may be performed in a soft V2X device or a soft V2X server. When the operation shown in FIG. 18 is performed by the soft V2X device, the soft V2X device may detect an abnormal operation while traveling on the road, determine that a hazard situation exists on the corresponding road, and transmit information about the hazard situation on the road to the soft V2X server. When the operation shown in FIG. 18 is performed in the soft V2X server, the soft V2X server may analyze a signal transmitted from a plurality of soft V2X devices (e.g., status information including sensor values of the soft V2X device) and detect the hazard situation on the road.

In a method of detecting a hazard situation on a road using location information of a soft V2X system, such as GPS, in the soft V2X system, amounts that are significantly different from a driving direction (longitude) to a vertical (latitude) direction. When acceleration occurs again after rapid deceleration by continuously comparing speed values of the soft V2X device over time, it may be detected that a hazard situation occurs. VRU devices that travel using wheels, such as a quickboard or a bicycle, may recognize hazard by comparing instantaneous amounts of impact generated along the Z axis. That is, when a method of measuring a position value on the Z axis is used, if a VRU device goes up or down an inclined road, the position value on the Z axis changes according to a continuous trend. However, when there is a pothole on the road or the road is in a poor condition, the position value on the Z axis may temporarily and rapidly change. The VRU device may detect the position value on the Z axis, which temporarily and rapidly changes, to recognize a road condition.

Figure 19:
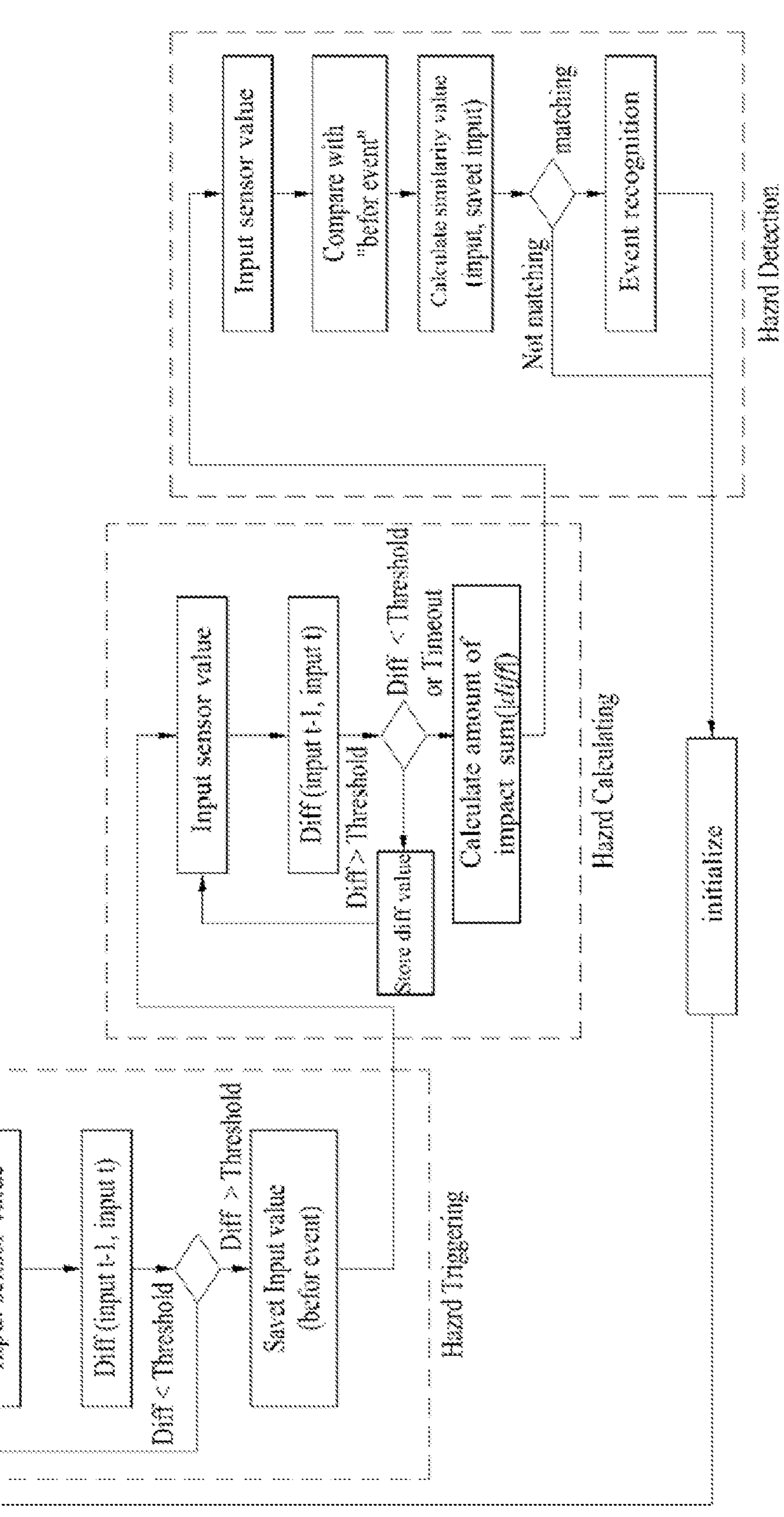
FIG. 19 is a diagram for explaining an operation of detecting a hazard situation on a road based on sensor values of a soft V2X device according to an embodiment of the present disclosure.

FIG. 19 is a diagram for explaining an operation of detecting a hazard situation on a road based on sensor values of a soft V2X device according to an embodiment of the present disclosure. The operation of FIG. 19 may be performed in a soft V2X device or a soft V2X server according to an embodiment. Referring to FIG. 19, in a hazard triggering step, the soft V2X device (or server) receives a sensor value (e.g., speed, position, or impact value), and calculates a difference between a previous value and a current value (difference value, hereinafter referred to as a diff value for convenience). Specifically, the soft V2X device (or server) acquires sensor values over time, and calculates a difference between the previous value (e.g., sensor value at time t−1) and the current value (e.g., sensor value at time t). The soft V2X device (or server) compares the diff value with a threshold value, and when the diff value is greater than the threshold value, the soft V2X device (or server) stores the previous input values and proceeds to a hazard calculating step.

In the hazard calculating step, the soft V2X device (or server) may calculate the amount of change (or amount of impact) and duration based on the amount of change in sensor values caused by the hazard situation on the road. Then, when out of a hazard zone, the soft V2X device may continue normal driving thereof, and the diff value gradually decreases. Then, when driving of the soft V2X device is stabilized again, the diff value may be smaller than the aforementioned threshold value. The soft V2X device (or server) cumulatively calculates and stores the amount of change (or impact) from when the diff value becomes larger than the threshold value until the diff value becomes smaller than the threshold value again, and moves to a hazard detection step.

In the hazard detection step, the soft V2X device (or server) collects an input sensor value for a certain period of time after the diff value becomes smaller than the threshold value again. In addition, the soft V2X device (or server) compares the sensor value stored before the event occurs with a sensor value after the collected diff value becomes smaller than the threshold value again, and when the sensor values have a similar pattern (or when the sensor values match), the soft V2X device recognizes the current situation as an event situation. However, when a momentum changes rapidly according to intention of a user, such as when a driving direction is changed or driving is stopped, a sensor value stored before an event occurs and a sensor value input after the event ends may be different (or the sensor values do not match). At this time, the soft V2X device (or server) is initialized without recognizing the current situation as an event situation. For example, when the soft V2X server receives a signal (or sensor values) from a plurality of soft V2X devices, if the sensor values described above are continuously generated at one point on the corresponding road, the soft V2X server recognizes that a hazard situation occurs on the road.

Figure 20:
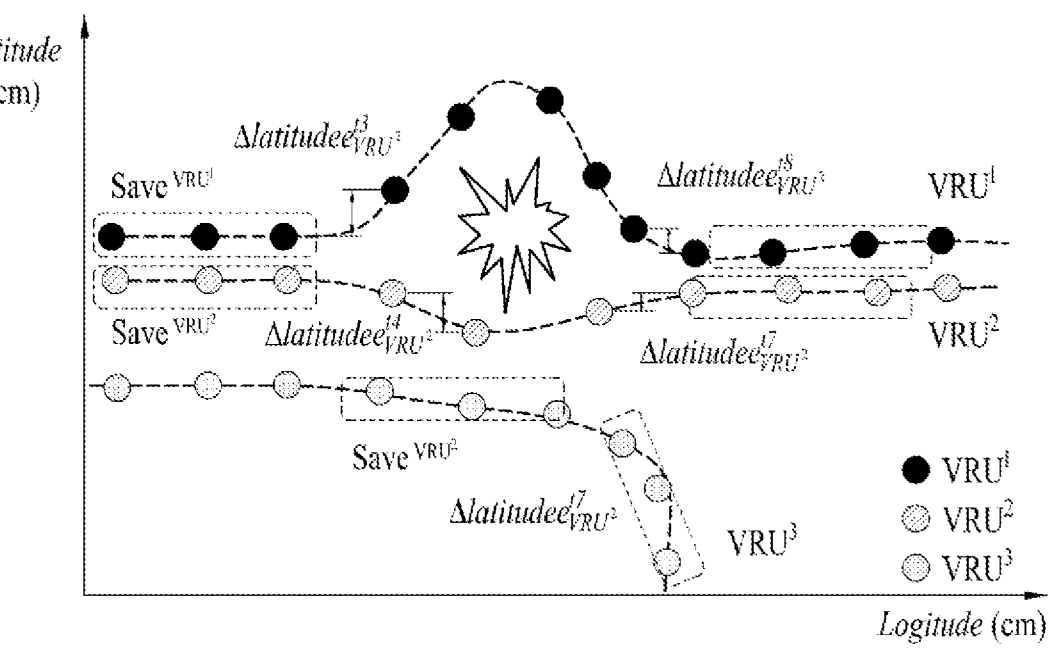
FIG. 20 is a diagram for explaining a method of using a value in a longitudinal direction for detecting a hazard situation according to an embodiment of the present disclosure.

FIG. 20 is a diagram for explaining a method of using a value in a longitudinal direction for detecting a hazard situation according to an embodiment of the present disclosure.

While traveling on a road, VRU1 abruptly changes a position thereof to a longitudinal side from a time point T3, then returns to its own route and goes straight from a time point T8. VRU2 also travels on the road, avoids a hazard zone from a time point T4, and then travels in the same direction as in the conventional case from a time point T7. On the other hand, VRU3 changes a driving direction from a time point T7 and makes a right turn regardless of a road condition. In this case, VRU1, VRU2, and VRU3 may be a first soft V2X device, a second soft V2X device, or a third soft V2X device in some embodiments.

VRU1 stores a previous sensor value as hazard calculation is triggered at a time point T3 due to a difference in sensor values, and then proceed to the hazard calculating step to accumulate and calculate a diff value between the sensor values. VRU1 estimates an event situation by accumulating a momentum used to avoid the event situation. Then, when the diff value becomes smaller than a specific threshold value, VRU1 enters the hazard detection step. In addition, VRU1 compares a sensor value input after entering the hazard detection step with a sensor value input before the event occurs, and recognizes the current situation as a hazard situation on the road when the sensor values have the same directivity. VRU2 recognizes the current situation as an event, but recognizes the current situation as a low-level hazard situation because the diff value used when avoiding the event is relatively small.

On the other hand, in the case of VRU3, the diff value changes greatly at a time point T7 and risk calculation is triggered, but again in the hazard detection step, driving continuities are compared based on a sensor value input after entering the hazard detection step and a sensor value input before an event occurs, and when similarity therebetween is low as a comparison result, the current situation is not recognized as a hazard situation.

Thus far, a method of detecting an abnormal operation of a soft V2X device in order to detect a hazard situation on the road and manage the road has been described. However, in the aforementioned method, since an abnormal behavior of a specific device or the variability in a specific area is not applied, the accuracy of the detected hazard situation may be lowered, and false information (or false alarm) may be disadvantageously transferred to other users. In order to resolve the above problem, a method of double checking a hazard situation using cooperative cognitive technology is additionally proposed below.

Figure 21:
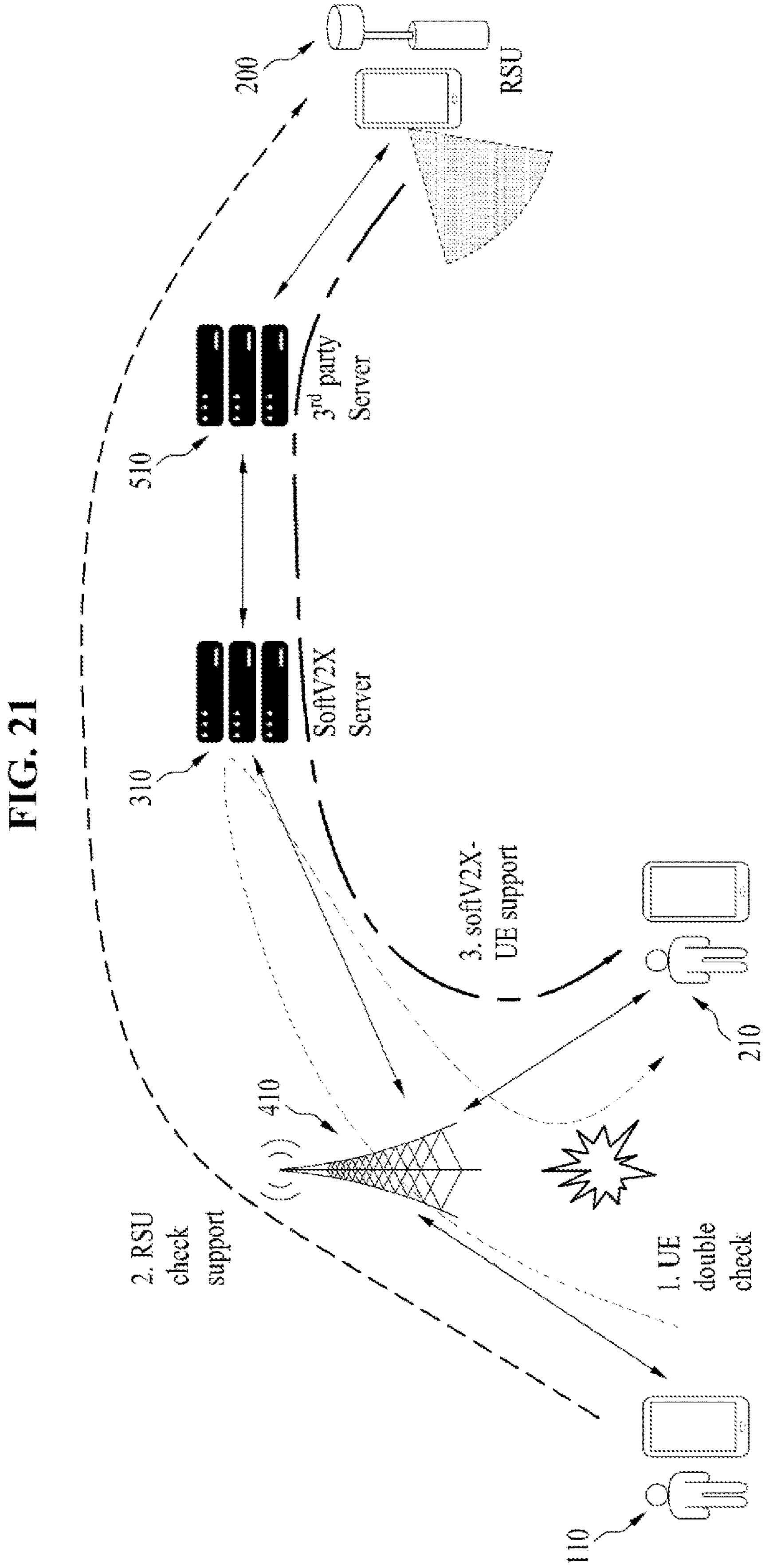
FIG. 21 is a diagram illustrating a configuration of a system for cooperative cognition according to an embodiment of the present disclosure.

FIG. 21 is a diagram illustrating a configuration of a system for cooperative cognition according to an embodiment of the present disclosure.

A cooperative cognitive method may include the following three methods. A first method is a method in which one soft V2X device recognizes a hazard situation and then other soft V2X devices passing through a hazard zone sense the corresponding hazard zone in more detail. A second method is to use a third-party server, and when the soft V2X device detects hazard, a third-party system such as a CCTV or petrol that manages the road rescans the corresponding hazard zone. A third method is a method in which, when a hazard situation on a road is detected by a third-party server, soft V2X devices traveling around the corresponding road recognize the hazard situation once more and report the recognized hazard situation to the soft V2X server.

When detecting a hazard situation on the road, the soft V2X server may perform double-check to increase the accuracy of information about the hazard situation.

Figure 22:
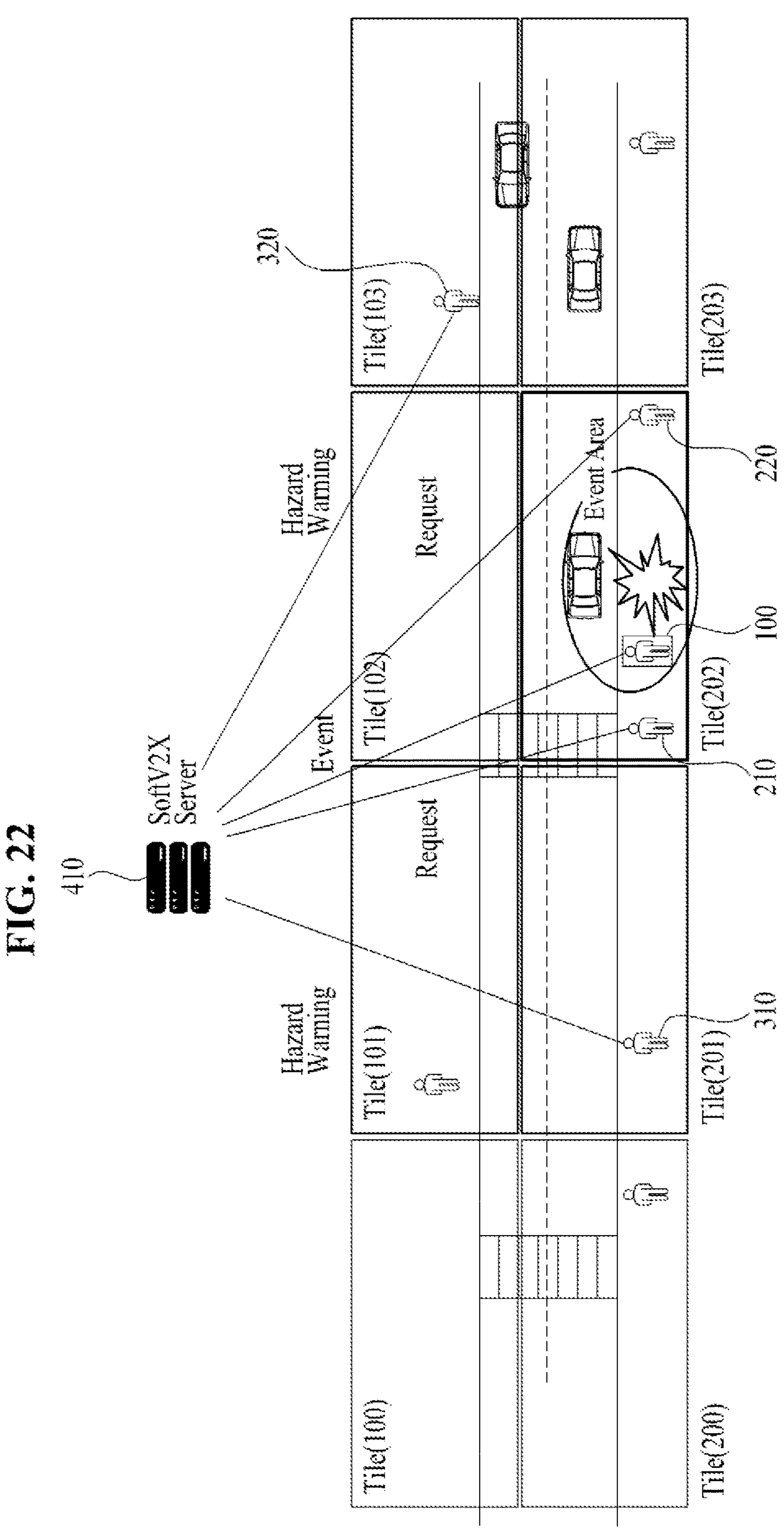
FIG. 22 is a diagram illustrating a method of selecting a soft V2X device for a soft V2X server to perform double-check according to an embodiment of the present disclosure.

FIG. 22 is a diagram illustrating a method of selecting a soft V2X device for a soft V2X server to perform double-check according to an embodiment of the present disclosure. When information on the hazard situation generated in a tile 202 is collected from the soft V2X device, the soft V2X server transmits information on the hazard situation to the soft V2X devices traveling around the tile 202 to provide safety information necessary for driving. In addition, the soft V2X server may adjust a human interface (HI) of soft V2X devices traveling around the tile 202 (e.g., volume up of warning sound, LCD forced on, or music mute) or provide information for controlling an application for additional safety protection (e.g., an operation of increasing an operation level of a black box before entering a hazard zone).

According to an embodiment, a range of tiles used for double check may vary according to a hazard situation. Changing the range of tiles may mean that the number of tiles used for double check varies while the size of one tile is fixed. Alternatively, in some embodiments, changing the range of tiles may mean that the size of each tile varies, and is not limited to the above example.

Referring to FIG. 22, the soft V2X server 410 may transmit information about a hazard situation to the soft V2X devices registered in the tile 202 and adjacent tiles 101, 102, 103, 201, and 203 in which the hazard situation occurs.

In addition, the soft V2X server 410 may additionally transmit a double check request message to a user of the tile 202 in which a hazard situation occurs and collect information on the corresponding hazard situation. In this case, the double check request message may be referred to as a cooperative cognitive request signal in some embodiments. As described above, the soft V2X server 410 may expand the range of tiles used for double check according to a hazard situation, and set the range of tiles longer based on a road condition or a driving direction of the user. The user requesting the double check request message may also adjust a requested tile size according to the severity and reliability of the hazard situation. For example, when a road condition is serious or the reliability of information on a hazard situation is low, information in a wider area may be obtained by expanding the range of tiles to increase accuracy on whether or not the corresponding hazard situation occurs.

Figure 23:
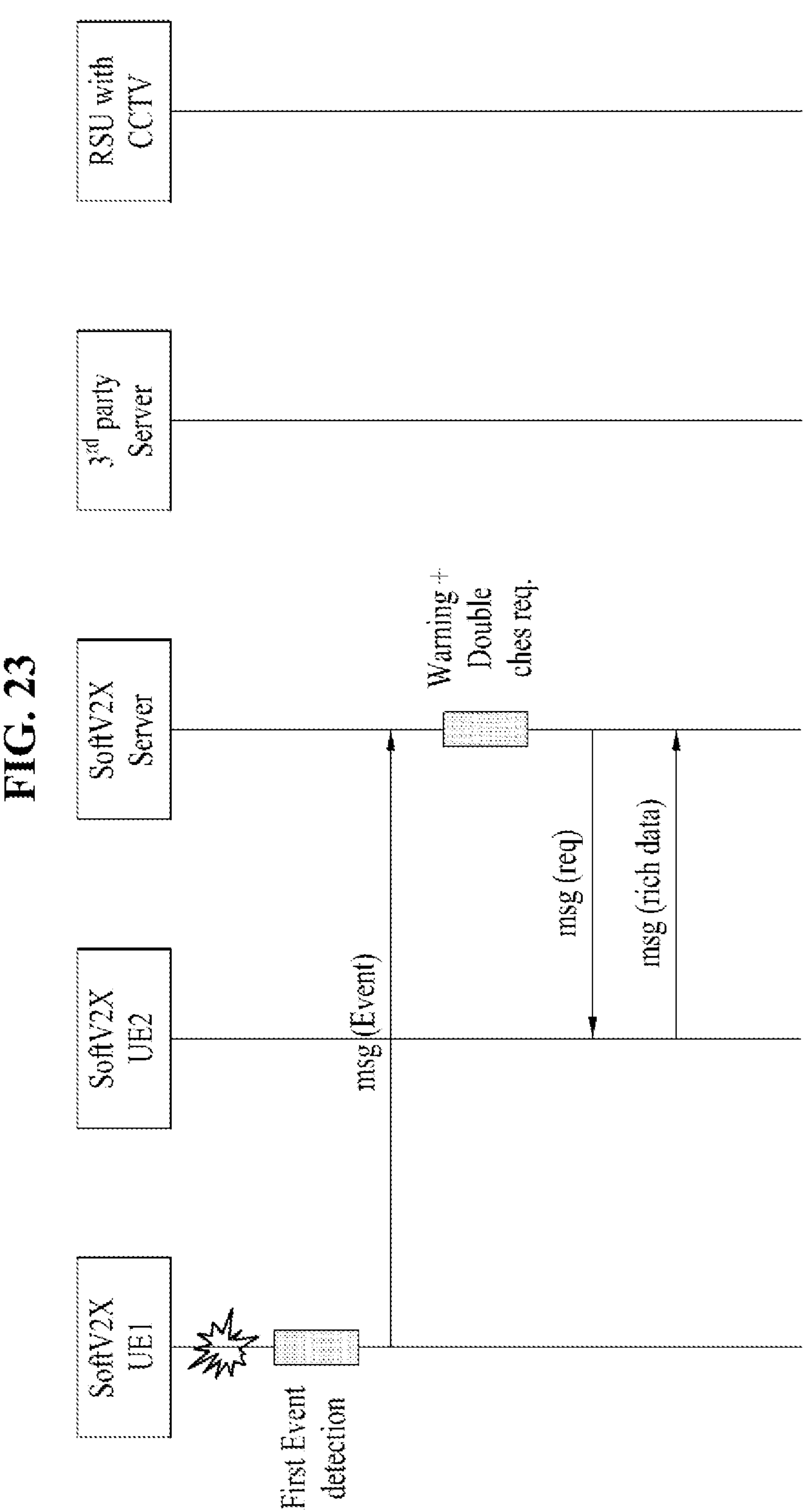
FIGS. 23 to 25 are diagrams showing a message transmitting procedure when the first to third cooperative cognitive methods are applied according to an embodiment of the present disclosure.

FIG. 23 is a diagram illustrating a message transmitting procedure when a first cooperative cognitive method is applied according to an embodiment of the present disclosure. According to the aforementioned first cooperative cognitive method, a soft V2X device 1 may detect an event (or a hazard situation on a road) and transmit information about the detected event to the soft V2X server. In addition, the soft V2X server may recognize the hazard of the event and transmit a double check request message to the soft V2X device 2 entering a zone in which the event occurs. The double check request message may include information on a sensor required by the soft V2X server, and may further include information for controlling the soft V2X device (e.g., adjustment of a sensing period). Upon receiving the double check request message, the soft V2X device 2 may intensively additionally collect the requested sensing information (e.g., sensor value) or image information, and transmit the collected information to the soft V2X server. Then, the soft V2X server may more accurately recognize a hazard situation and transmit updated information about the hazard situation to soft V2X devices traveling in the corresponding zone.

Figure 24:
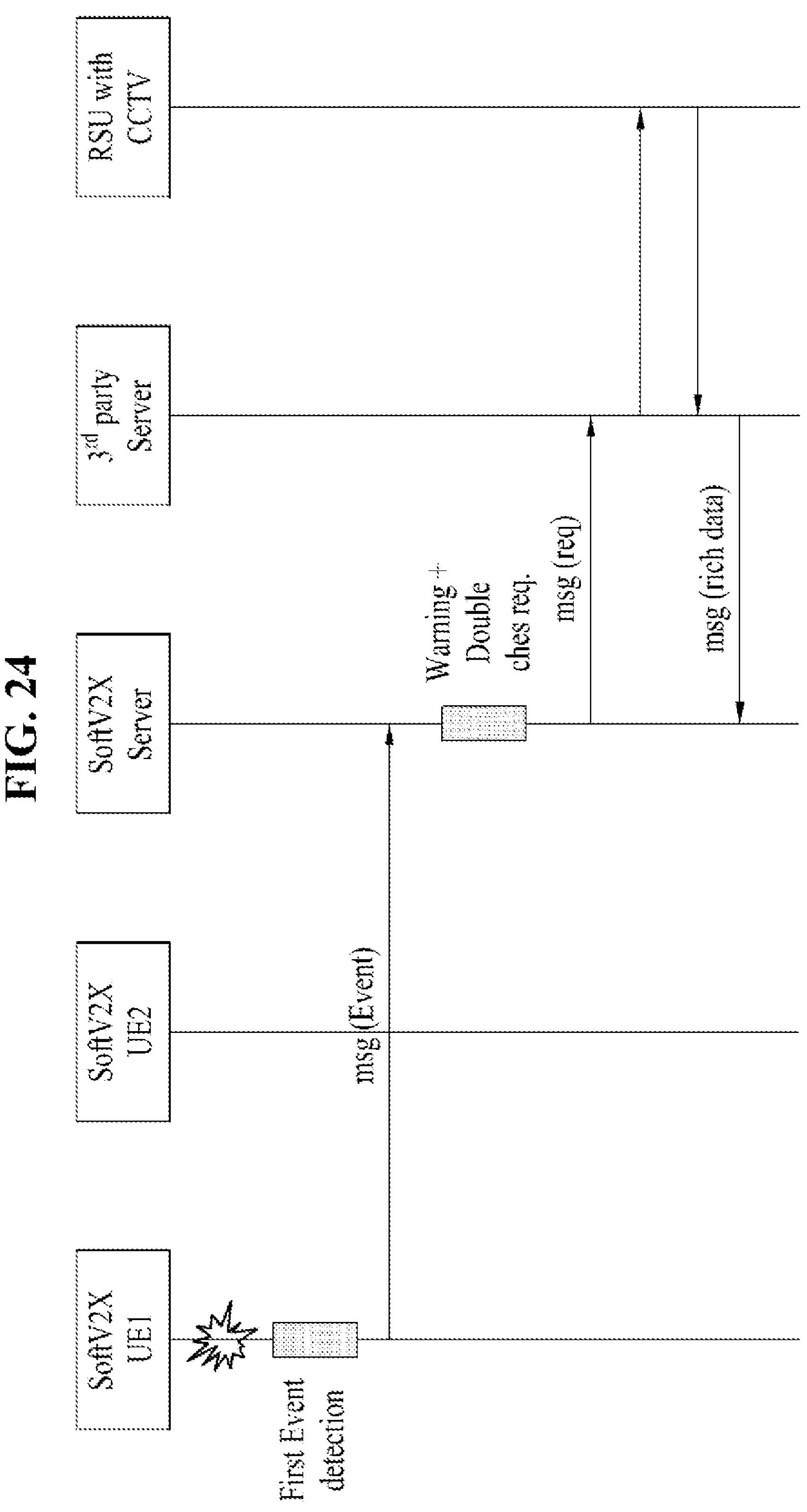

FIG. 24 is a diagram illustrating a message transmission process when a second cooperative cognitive method is applied according to an embodiment of the present disclosure. According to the aforementioned first cooperative cognitive method, the soft V2X device 1 may detect an event and transmit information about the detected event to the soft V2X server. The soft V2X server may recognize the hazard of the event and transmit a double check request message to a third-party server that manages a zone in which the event occurs. Upon receiving the double check request message, the third-party server adjusts the CCTV to coordinates of the corresponding zone to acquire more detailed information about the event in the corresponding zone. The third-party server may transmit the acquired video information or processed situation information back to the soft V2X server. The soft V2X server may more accurately detect the event based on the information received from the third-party server, and the soft V2X server may transmit updated event-related information to soft V2X devices traveling around the corresponding zone.

Figure 25:
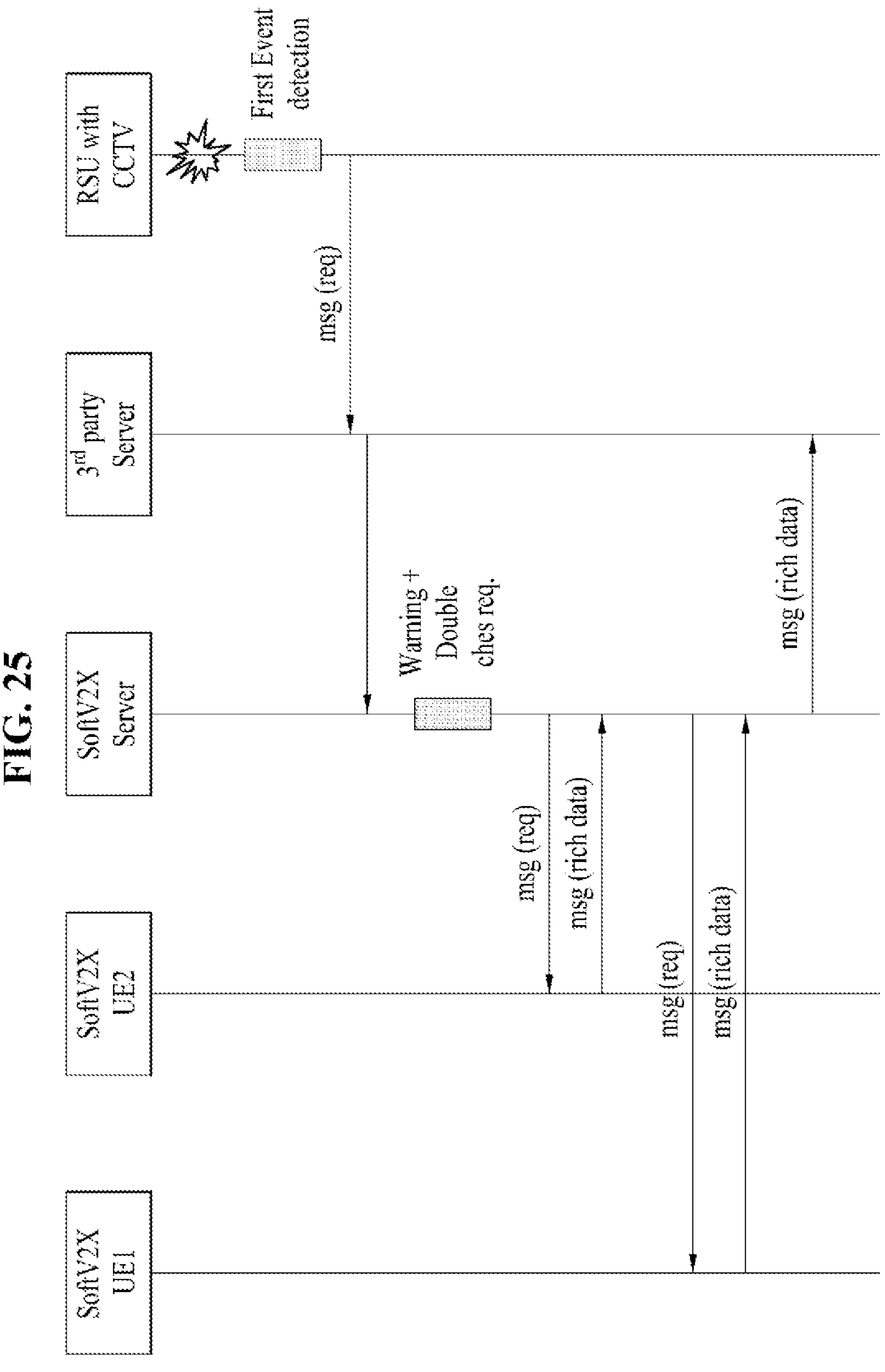

FIG. 25 is a diagram illustrating a message transmission process when a third cooperative cognitive method is applied according to an embodiment of the present disclosure. When a third-party system recognizes hazard in a specific area, the third-party server may transmit a double check request message to the soft V2X server to more accurately recognize a road condition. Upon receiving the double check request message, the soft V2X server may select soft V2X devices that enter the corresponding zone based on a location of a zone in which an event occurs, and request additional information about the corresponding zone from the selected soft V2X devices. At this time, the additional information may include sensor values (or sensor information) or image information of soft V2X devices, but is not limited thereto. The selected SoftV2X devices may transmit additional information about the corresponding zone to the soft V2X server, and the soft V2X server may more accurately obtain information about the hazard situation of the road based on the additional information received from the soft V2X devices. The soft V2X server may transmit information about the hazard situation of the road to soft V2X devices traveling in the corresponding zone. In addition, the soft V2X server may increase the precision of a road management service by transmitting additional information to a third-party server.

In order to perform the aforementioned operation of recognizing and reporting a hazard situation on a road, double-check operation through cooperative cognition to increase the accuracy of recognition of a hazard situation, and operation of notifying adjacent UEs of a hazard situation, a message configuration for performing the operation is required.

Figure 26:
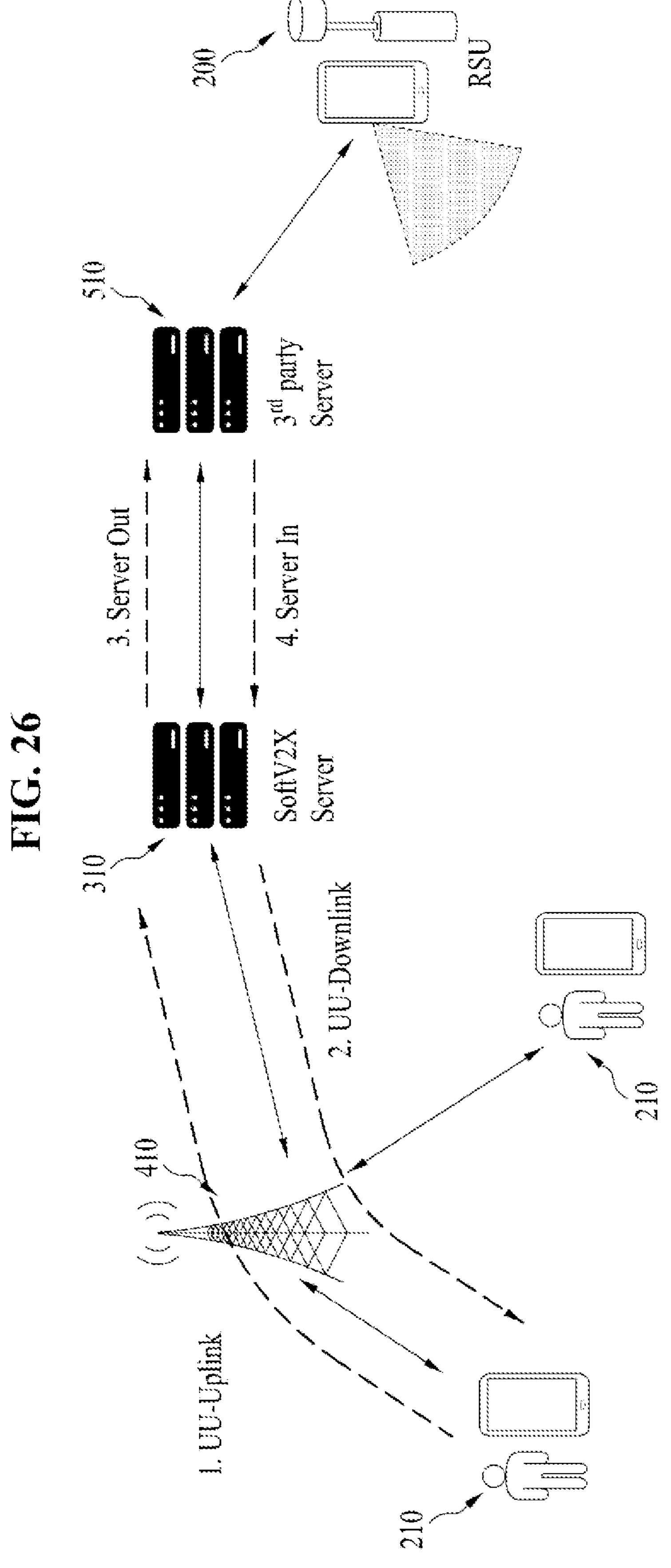
FIG. 26 is a diagram illustrating an interface through which a message is operated according to an embodiment of the present disclosure.

FIG. 26 is a diagram illustrating an interface through which a message is operated according to an embodiment of the present disclosure. Referring to FIG. 26, there are a Uu-uplink period in which the soft V2X device 210 transmits a signal (or message/information) to the soft V2X server 410 and a Uu-downlink period in which the soft V2X server 410 transmits a signal to the soft V2X device 210. In the Uu-uplink period and the Uu-downlink period, a Uu interface is used and IP data communication using message queuing telemetry transport (MQTT) may be used. The message may have a vulnerable road users (VRU) message format based on the existing intelligent transport system (ITS) message. In order to communicate with the third-party server, an operation of transmitting and receiving may be performed basically with a wired interface, and a third-party server and a predefined interface may be used. For example, for connection between ITS networks, in Europe, an IP-based advanced message queuing protocol (AMQP) method defined by CROAD is used, and the same message type as the existing ITS message is used.

FIG. 27 is a diagram illustrating a message format for detecting a hazard situation according to an embodiment of the present disclosure. Referring to FIG. 27, when the soft V2X device transmits status information (e.g., sensor values) of the SoftV2X device and the SoftV2X server recognizes a hazard situation on the road, the message format may be configured with a message header and a VRU payload including VRU information like the existing VRU message. At this time, the message may include information (e.g., sensor values) used to recognize a hazard situation of the road in the soft V2X server. When the soft V2X device recognizes the hazard situation on the road, a hazard information container may be added after the VRU message. For example, the hazard information container may include a rich data container for transmitting 1) hazard information containing information about a basic hazard situation and 2) additional information for cooperative cognition and double check.

When a soft V2X server transmits a message, a soft V2X message is used. A header of the soft V2X message follows a common format of the soft V2X message and indicates that the message is transmitted from the soft V2X server. A payload of the soft V2X message may include information to be transmitted from the soft V2X server. For example, the payload may include common safety information and/or information formed by integrating messages of VRU devices (or soft V2X device). The soft V2X server may transmit a double check request message to request cooperative cognition to VRU devices (or soft V2X devices) or related third-party servers traveling in the corresponding zone. When a hazard situation is detected, the soft V2X server transmits hazard information and rich data in addition to the soft V2X message in order to notify nearby devices (e.g., soft V2X device or road management system) of the detected hazard situation.

A message of risk information and rich data according to an embodiment may be configured as shown in the table below.

TABLE 5

| ASN.1 Representation | |
|---|---|
| DF_HazardContents | ::= SEQUENCE { |
| EventID | INTEGER, |
| EventType | INTEGER, |
| EventTime | INTEGER, |
| EventPositionType | INTEGER, |
| EventPositionA | DF_Position |
| EventPositionB | DF_Position |
| EventHistoryPosition | SEQUENCE of DF_Position |
| EventHistoryVelocity | SEQUENCE DF_Velocitiy |
| RawSensor | SEQUENCE of INTEGER |
| VideoData | SEQUENCE of INTEGER |
| } | |

Referring to Table 5 above, EventID is for identifying each hazard situation, and EventType represents a type of hazard situation. For example, when a value of EventType is 1, this indicates that there is a pothole, 2 indicates that there are bumps on a road, 3 indicates that this is under construction, 4 indicates that there are obstacles, and 5 indicates that there are crowds on the road. However, the present disclosure is not limited to the above example. EventTime indicates a time at which an event is measured. EventPositionA and EventPositionB are for expressing a location of a region in which the hazard situation occurs in the form of a rectangle and a circle through two points (A and B). Whether the location is expressed as a rectangle or a circle may be expressed by EventPositionType. When the EventPositionType value is 1, this represents a rectangle, and 2 may represent a circle, but the present disclosure is not limited thereto.

Rich data may represent detailed information about a region in which a hazard situation occurs. EventHistoryPath represents movement path information of a UE located around a region in which an event occurs. For example, the movement path information of the UE may include GPS information of the UE expressed in the form of (x, y, z), but the present disclosure is not limited thereto. EventHistoryVelocity represents a change in velocity of the UE around the region in which the event occurs, and RawSensor represents the amount of change in a specific sensor value around the region in which the event occurs. VideoData represents captured image information when a camera image is captured around the region in which the event occurs.

FIG. 28 is a diagram for explaining a method of expressing a region where an event occurs based on coordinate values of EventPositionA and B. When the region in which the event occurs is expressed in a rectangular shape, a value of EventPositionType may be set to 1, and a corner point of the rectangle may be expressed based on the locations of points A and B. When the region in which the event occurs is expressed in the form of a circle, the value of EventPositionType may be set to 2, a value of EventPositionA represents the center of the circle, and the value of EventPositionB may be used as a value representing a diameter of the circle. For convenience of calculation, the value of the X-axis may be set equal to the value of EventPositionA, but the present disclosure is not limited thereto.

In order to perform cooperative cognition according to an embodiment of the present disclosure, a process of transmitting and receiving a double check request message may be required, and the double check request message may be configured as shown in Table 6 below.

TABLE 6

ASN.1 Representation

```
DF_HazardReq.                 ::= SEQUENCE {
  EventID                          INTEGER,
  EventType                        INTEGER,
  EventTime                        INTEGER,
  EventPositionA                 DF_Position
  EventPositionB                 DF _Position
  RequestSensor                  INTEGER
  RequestSensingDuration       INTEGER
}
```

Referring to Table 6, EventID, EventType, EventTime, and EventPosition are information for distinguishing each event. SoftV2X devices receiving the double check request message may collect additional information from the vicinity of a corresponding zone based on the double check request message. In addition, in order to obtain more accurate information, a SoftV2X server may additionally request necessary information. RequestSensor may be used to additionally request sensor information required by the SoftV2X server. When a value of RequestSensor is 1, this may be interpreted as requesting a GPS value, 2 may be interpreted as requesting a geomagnetic sensor value, 3 may be interpreted as requesting a gyro sensor value, 4 may be interpreted as requesting video information, and 5 may be interpreted as requesting microphone information (or sound information). RequestSensingDuration is for setting an information collection period. The information collection section may be set in units of 1 m, but the present disclosure is not limited thereto. Through the RequestSensingDuration, a period in which forward and backward sensing starts and ends based on a point in which an event occurs may be set.

According to an embodiment of the present disclosure, an operation of the SoftV2X device may be adjusted to protect the safety of pedestrians, and a control message to control the operation of the SoftV2X device may be transmitted and received. At this time, the control message may be configured as shown in Table 7 below. In Table 7, DF_ControlReq means the control message.

TABLE 7

ASN.1 Representation

```
DF_ControlReq.     ::= SEQUENCE {
  EventID          INTEGER,
  LCDControl          INTEGER, -- 0: not control, 1: On, 2: Off
  SoundControl        INTEGER, -- 0: not control, 1: On, 2: Volume up,
                        3: Volume Down, 4: mute
  Entertainment AppControl      INTEGER, -- 0: not control, 1: Pause
  BlackBoxAppControl  INTEGER, -- 0: not control, 1: Level 1, 2: Level 2
  eCallAppControl     INTEGER, -- 0: not control, 1: Activate, 2:deActivate
}
```

DF_ControlReq includes a message for controlling an HMI of a receiving device and other applications. EventID is to compare/distinguish each event. LCDControl and SoundControl are information for controlling a human interface (HI) when an event occurs. Specifically, LCDControl is information for forcibly turning on or off a screen of the SoftV2X device, and SoundControl is information for forcibly turning on sound or raising or lowering the volume from a preset standard.

In addition, DF_ControlReq may be used to control other associated applications. EntertainmentAppControl may be used to pause an application for playing music and/or video, and BlackBoxAppControl and eCallAppControl may be used to control the mode and operation of black box as a safety application and an E-call application.

FIG. 29 is a flowchart for explaining an operation of a first apparatus according to an embodiment of the present disclosure.

In FIG. 29, the first apparatus and the second apparatus may refer to devices operating in a wireless communication system supporting the soft V2X communication described above.

Referring to FIG. 29, the first apparatus may receive status information including sensor values of the second apparatus (S2900). The sensor values of the second apparatus may refer to values sensed by one or more sensors mounted on the second apparatus over time, and at least one of a GPS value, a geomagnetic sensor value, and a gyro sensor value of the second apparatus, but the present disclosure is not limited to the above examples.

Referring to FIG. 29, the first apparatus may transmit information about a hazard situation of a road detected based on the sensor values of the second apparatus to other apparatuses (S2910). The hazard situation on the road may include, for example, a case in which a pothole is present on the road, a case in which carcasses of animals or fragments of traffic accidents are present on the road, a case in which traffic lights on the road are broken, a case in which pavement on the road is damaged, and a case in which an object falls from a vehicle driving on the road, but the present disclosure is not limited to the above example. In addition, the information on the hazard situation on the road includes at least one of information to identify the hazard situation, information indicating a type of the hazard situation, information on a time at which the hazard situation is detected, information indicating an area in which the hazard situation is detected, and information indicating a type of the detected area, but the present disclosure is not limited thereto. For example, referring to Table 5 above, an EventID field may correspond to information for identifying a hazard situation on the road, an EventType field may correspond to information indicating a type of the hazard situation, an EventTime field may correspond to information about a time at which the hazard situation is detected, and fields of EventPositionA and B may correspond to information indicating an area in which the hazard situation is detected, and an EventPositionType field may correspond to information indicating a type of the area in which the hazard situation is detected.

The first apparatus may transmit information on the hazard situation of the road to the second apparatus as well as one or more third apparatuses located in an area adjacent to the road. In this case, the third device may refer to a server of a $3^{rd}$ party such as a road management entity (e.g., the road management corporation), but the present disclosure is not limited thereto. The first apparatus may be helpful in protecting users driving in the area adjacent to the road by transmitting information on the hazard situation on the road not only to the second apparatus but also to the third apparatuses.

The hazard situation on the road may be detected based on 1) change amounts between a first time point when a change amount of the sensor values becomes larger than a threshold value and a second time point when the change amount again becomes less than the threshold value, and 2) similarity of the sensor values before the first time point and after the second time point. More specifically, the first apparatus may collect sensor values of the second apparatus at regular intervals, and determine whether the amount of change in sensor values over time (for example, the change amount of a sensor value at time t−1 and a sensor value at time t) is greater than a threshold value. When the amount of change in sensor values is greater than a threshold value, this may mean that a change in a driving situation occurs, and in order to determine whether the change corresponds to a hazard situation on an actual road, the first apparatus may calculate an accumulated value of changes between a first time point when the change amount of sensor values is greater than the threshold value and a second time point when the change amount becomes less than or equal to the threshold value. At this time, when the accumulated value is greater than a preset value, the first apparatus may determine that a road hazard situation occurs. However, when a driving direction is changed according to intention of a user or the user stops driving, even if the current situation is not a hazard situation on the road, the accumulated value of the change amount may be greater than the preset value. Therefore, it is necessary to reduce the probability of delivering incorrect information about the hazard situation by distinguishing a case in which the driving changes according to intention of the user and a case in which the hazard situation occurs on the road. Accordingly, the first apparatus may determine whether the similarity between the sensor value before the first time point and the sensor value after the second time point is below a threshold level, and when the similarity between the sensor values is equal to or less than the threshold level, the first apparatus may determine that no road hazard situation occurs (or determine that the current situation is a change in driving according to intention of the user). In this case, when the similarity between the sensor values is below the threshold level, this may mean that a difference between the sensor values is above the threshold level.

In some embodiments, detecting the hazard situation on the road may be performed by the second apparatus. When the second apparatus detects a hazard situation on the road, status information transmitted to the first apparatus may include information indicating that a hazard situation on the road is detected. At this time, the first apparatus may transmit information about the hazard situation of the road to apparatuses located around the road based on the status information received from the second apparatus.

When the reliability of the fact that the first apparatus or the second apparatus operates abnormally or a hazard situation on the road is detected is relatively low, incorrect information about the hazard situation on the road may be delivered, and thus there may be a method of additionally detecting whether the hazard situation on the corresponding road is detected. Accordingly, based on detection of the hazard situation on the road, the first apparatus may transmit a message to one or more third apparatuses for requesting additional information on the detected hazard situation. For example, the additional information may include at least one of movement path information, speed change information, a sensor value, sound information, and camera image information of one or more third apparatuses. Referring to Table 5 above, EventHistoryPosition may correspond to movement path information, EventHistoryVelocity may correspond to speed change information, RawSensor may correspond to sensor value, and VideoData may correspond to camera image information. A message for requesting additional information may include the aforementioned double check request message. In addition, one or more third apparatuses may include a device located in an area adjacent to the road in which the hazard situation is detected, or a third-party server associated with the road in which the hazard situation is detected (for example, a server of the road management corporation that manages the road in which the hazard situation is detected), but the present disclosure is not limited thereto. In addition, the message for requesting additional information may further include information for controlling the third device. At this time, the information for controlling the third device may include at least one of information for controlling a sensor of the third device necessary to obtain additional information, information for controlling an operation notifying the third device of hazard, and information for controlling an operation of an application related to the safety of the third device. For example, the operation of notifying the third device of hazard may include an operation of adjusting a human interface (HI) that notifies the third device of hazard, and the operation of adjusting an HI may include an operation of adjusting the volume of a warning sound, adjusting a screen of the third device to be forcibly turned on, or adjusting the sound of music, but the present disclosure is not limited to the above example. In addition, the operation of the application related to the safety of the third device may include an operation such as increasing an operation level of a black box before the third device enters a hazard area, but the present disclosure is not limited to the above example.

In response to the message requesting additional information, the first apparatus may receive additional information from one or more third apparatuses, and may update information about a hazard situation on the road based on the received additional information. The first apparatus may transmit information about the hazard situation of the updated road to the second apparatus and/or one or more third apparatuses.

Hereinafter, a device to which various embodiments of the present disclosure may be applied will be described.

Although not limited thereto, various descriptions, functions, procedures, proposals, methods, and/or operational flow charts disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 30:
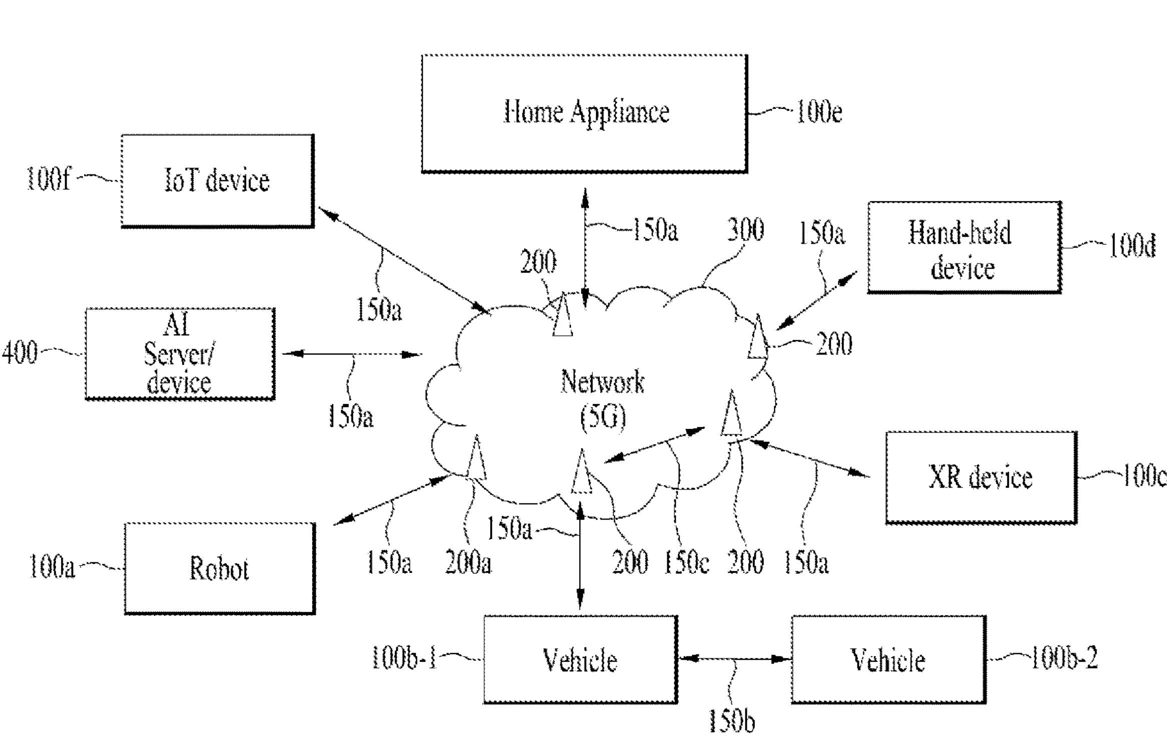
FIG. 30 illustrates a communication system applied to the present disclosure.

FIG. 30 illustrates a communication system 1 applied to the present disclosure.

Referring to FIG. 30, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BS s/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 31:
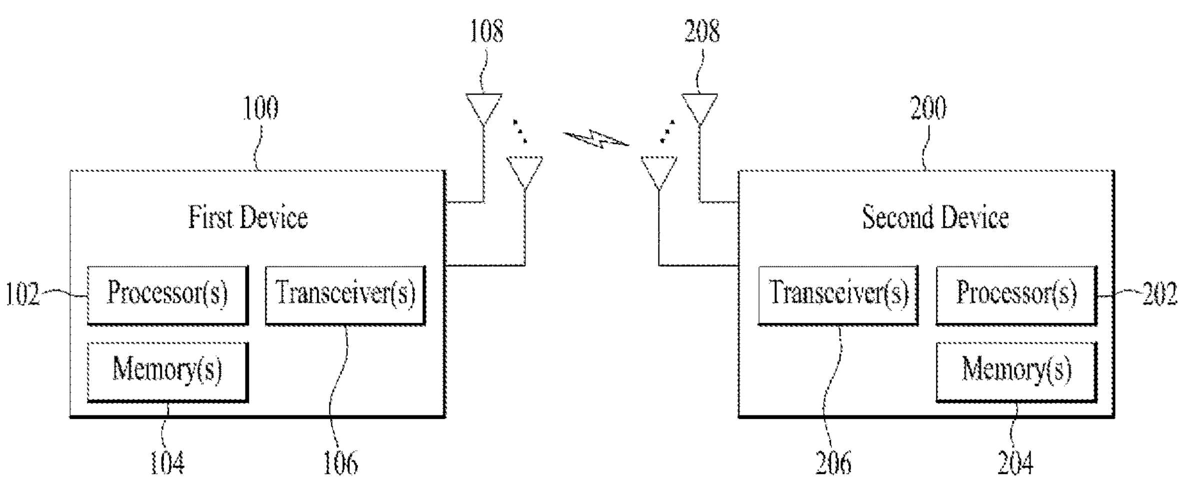
FIG. 31 illustrates wireless devices applicable to the present disclosure.

FIG. 31 illustrates a wireless device applicable to the present disclosure.

Referring to FIG. 31, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 30.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

In the present specification, at least one memory (e.g., 104 or 204) may store instructions or programs, and the instructions or the programs may, when executed by at least one processor, cause the at least one processor operably connected to the at least one memory to perform operations according to some embodiments or implements of the present specification.

In the present specification, a computer-readable storage medium may store at least one instruction or computer program, and the at least one instruction or computer program may, when executed by at least one processor, cause the at least one processor to perform operations according to some embodiments or implements of the present specification.

In the present specification, a processing device or apparatus may include at least one processor and at least one memory to be connected to the at least one processor. The at least one computer memory may store instructions or programs, and the instructions or the programs may, when executed by at least one processor, cause the at least one processor operably connected to the at least one memory to perform operations according to some embodiments or implements of the present specification.

Figure 32:
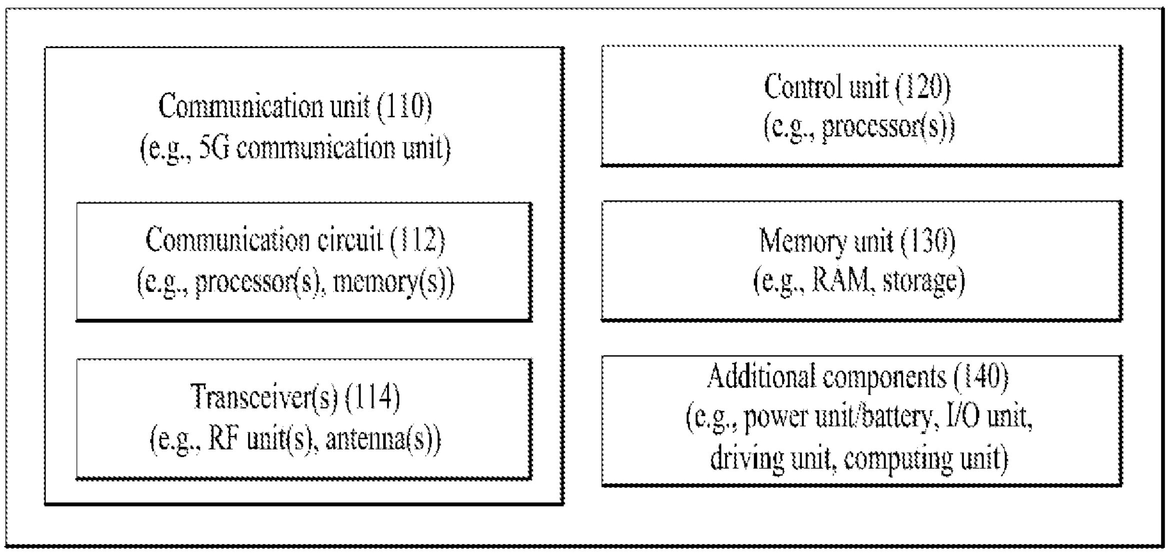
FIG. 32 illustrates another example of a wireless device to which the present disclosure is applied.

FIG. 32 illustrates another example of a wireless device applied to the present disclosure. The wireless device may be implemented in various forms according to a use-case/service (refer to FIG. 30)

Referring to FIG. 32, wireless devices 100 and 200 may correspond to the wireless devices 100 and 200 of FIG. 31 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 27. For example, the transceiver(s) 114 may include the one or more transceivers 106 and 206 and/or the one or more antennas 108 and 208 of FIG. 31. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. the vehicles (100*b*-1 and 100*b*-2 of FIG. 30), the XR device (100*c* of FIG. 30), the hand-held device (100*d* of FIG. 30), the home appliance (100*e* of FIG. 30), the IoT device (100*f* of FIG. 30), a digital broadcast terminal, a hologram device, a public safety device, an MTC device, a medicine device, a fintech device (or a finance device), a security device, a climate/environment device, the AI server/device (400 of FIG. 30), the BSs (200 of FIG. 30), a network node, etc. The wireless device may be used in a mobile or fixed place according to a use-example/service.

In FIG. 32, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Here, wireless communication technologies implemented in the wireless devices (100, 200) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (100, 200) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (100, 200) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

Figure 33:
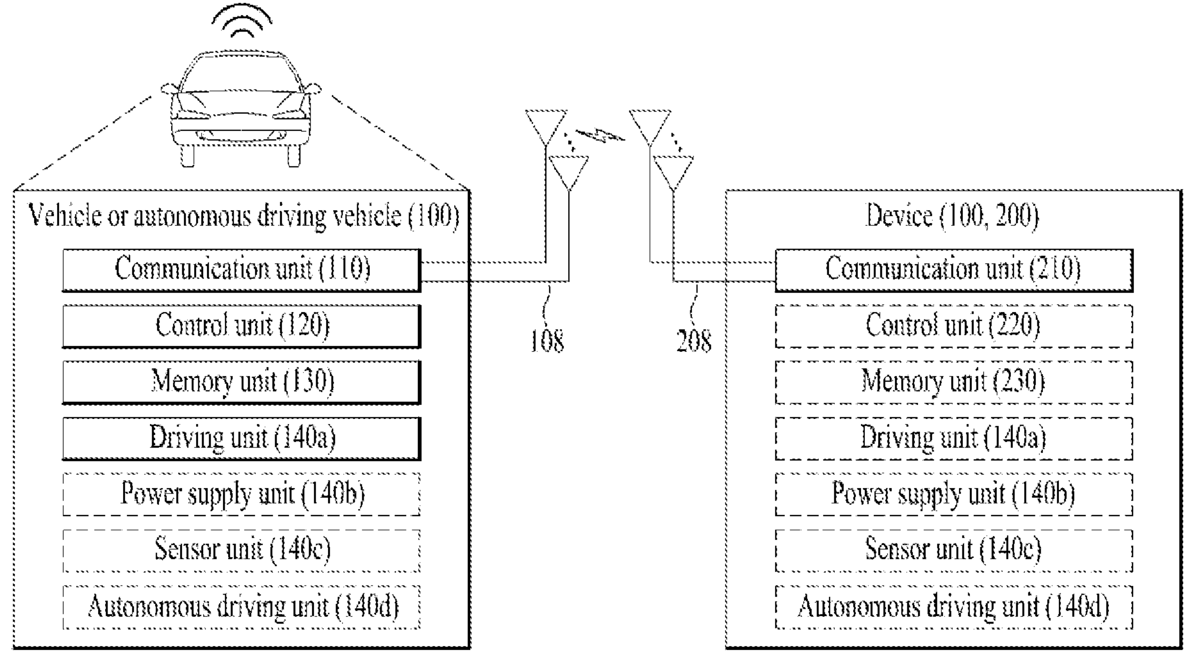
FIG. 33 illustrates a vehicle or an autonomous driving vehicle applied to the present disclosure.

FIG. 33 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 33, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 32, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the acquired data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used for a terminal, a base station, or other equipment of a wireless mobile communication system.

What is claimed is:

1. A second apparatus supporting vehicle to everything (V2X) communication, the second apparatus comprising:

at least one transceiver;

at least one processor; and at least one computer memory operably connected to the at least one processor and storing programs that, when executed, cause the at least one processor to perform operations, the operations comprising:

storing a plurality of sensor values $V_{t1}$, $V_{t1+\Delta t}$, $V_{t1+2\Delta t}$, . . . , $V_{t2-\Delta t}$, $V_{t2-\Delta t}$, $V_{t2}$ respectively obtained at a plurality of time points t1, t1+Δt, t1+2Δt, . . . t2−2Δt, t2−Δt, t2 from a first time point t1 to a second time point t2, based on a difference $V_{t1+\Delta t}-V_{t1}$ between a sensor value $V_{t1}$ at the first time point and a sensor value $V_{t1+\Delta t}$ at a time point t1+Δt following the first time point t1 being larger than a threshold value T, and based on a difference $V_{t2+\Delta t}-V_{t2}$ between a sensor value $V_{t2}$ at the second time point t2 and a sensor value $V_{t2+\Delta t}$ at a time point t2+Δt following the second time point t2 being less than the threshold value T, wherein $V_t$ is a sensor value at a time point t, where t=t1, t1+Δt, t1+2Δt, . . . , t2−2Δt, t2−Δt, t2, and Δt is a sensing periodicity;

determining that a hazard situation has occurred on a road, based on a similar pattern of sensor values to that of the stored plurality of sensor values $V_{t1}$, $V_{t1+\Delta t}$, $V_{t1+2\Delta t}$, . . . , $V_{t2-2\Delta t}$, $V_{t2-\Delta t}$, $V_{t2}$ being detected on the road after the second time point t2; and transmitting event information regarding the hazard situation detected by the second apparatus to a first apparatus.

2. The second apparatus of claim 1, wherein the operations further comprise:

receiving updated information regarding the hazard situation on the road from the first apparatus.

3. The second apparatus of claim 2, wherein the updated information regarding the hazard situation on the road includes at least information for identifying the hazard situation, information indicating a type of the hazard situation, information on a time at which the hazard situation is detected, information indicating a zone in which the hazard situation is detected, or information indicating a type of the zone.

4. A method performed by a second apparatus, the method comprising:

storing a plurality of sensor values $V_{t1}$, $V_{t1+\Delta t}$, $V_{t1+2\Delta t}$, . . . , $V_{t2-2\Delta t}$, $V_{t2-\Delta t}$, $V_{t2}$ respectively obtained at a plurality of time points t1, t1+Δt, t1+2Δt, . . . t2−2Δt, t2−Δt, t2 from a first time point t1 to a second time point t2, based on a difference $V_{t1+\Delta t}-V_{t1}$ between a sensor value $V_{t1}$ at the first time point and a sensor value $V_{t1+\Delta t}$ at a time point t1+Δt following the first time point t1 being larger than a threshold value T, and based on a difference $V_{t2+\Delta t}-V_{t2}$between a sensor value $V_{t2}$ at the second time point t2 and a sensor value $V_{t2+\Delta t}$ at a time point t2+Δt following the second time point t2 being less than the threshold value T, wherein $V_t$ is a sensor value at a time point t, where t=t1, t1+Δt, t1+2Δt, . . . , t2−2Δt, t2−Δt, t2, and Δt is a sensing periodicity;

determining that a hazard situation has occurred on a road, based on a similar pattern of sensor values to that of the stored plurality of sensor values $V_{t1}$, $V_{t1+\Delta t}$, $V_{t1+2\Delta t}$, . . . , $V_{t2-2\Delta t}$, $V_{t2-\Delta t}$, $V_{t2}$ being detected on the road after the second time point t2; and transmitting event information regarding the hazard situation detected by the second apparatus to a first apparatus.

5. The method of claim 4, further comprising:

receiving updated information regarding the hazard situation on the road from the first apparatus.

6. The method of claim 5, wherein the updated information regarding the hazard situation on the road includes at least information for identifying the hazard situation, information indicating a type of the hazard situation, information on a time at which the hazard situation is detected, information indicating a zone in which the hazard situation is detected, or information indicating a type of the zone.

* * * * *